(12) United States Patent
Asai et al.

(10) Patent No.: US 7,747,870 B2
(45) Date of Patent: *Jun. 29, 2010

(54) APPARATUSES AND METHODS FOR DECRYPTING ENCRYPTED DATA AND LOCATING THE DECRYPTED DATA IN A MEMORY SPACE USED FOR EXECUTION

(75) Inventors: Rieko Asai, Hirakata (JP); Yukie Shoda, Moriguchi (JP); Teruto Hirota, Moriguchi (JP); Yoshikatsu Ito, Hirakata (JP); Taichi Sato, Moriguchi (JP); Hideki Matsushima, Osaka (JP); Toshihisa Abe, Izumisano (JP)

(73) Assignee: Panasonic Corporation, Osaka (JP)

( * ) Notice: Subject to any disclaimer, the term of this patent is extended or adjusted under 35 U.S.C. 154(b) by 395 days.

This patent is subject to a terminal disclaimer.

(21) Appl. No.: 11/790,399

(22) Filed: Apr. 25, 2007

(65) Prior Publication Data

US 2007/0294534 A1 Dec. 20, 2007

Related U.S. Application Data

(62) Division of application No. 10/630,674, filed on Jul. 31, 2003, now Pat. No. 7,228,423.

(30) Foreign Application Priority Data

| Aug. 1, 2002 | (JP) | ............................. 2002-225289 |
| Dec. 11, 2002 | (JP) | ............................. 2002-359072 |
| Jun. 2, 2003 | (JP) | ............................. 2003-157255 |

(51) Int. Cl.
G06F 9/00 (2006.01)

(52) U.S. Cl. .................. 713/189; 713/193; 380/28; 380/284

(58) Field of Classification Search ................ 713/189, 713/193; 380/28, 284
See application file for complete search history.

(56) References Cited

U.S. PATENT DOCUMENTS 4,649,510 A 3/1987 Schmidt (Continued)

FOREIGN PATENT DOCUMENTS

AU 199659457 1/1997

(Continued)

*Primary Examiner*—Thomas R Peeso
(74) *Attorney, Agent, or Firm*—Wenderoth, Lind & Ponack, L.L.P.

(57) ABSTRACT

An encrypted-data decrypting apparatus that provides enhanced security protection for programs and data while they are in the processes of decryption to execution after having been encrypted. When a decrypted partial program needs to be loaded into the shared memory M, the controlling unit 11 loads it into an area indicated by the memory location information. According to the memory location information, a plurality of partial programs are sequentially loaded into an area so that one partial program gets overwritten by another; therefore, none of the partial programs exists in the memory for a long time, and thus there is less possibility of having the partial programs referred to illegitimately. In addition, since every time some data is decrypted, the decryption support program authenticating unit 13 confirms authenticity of the decryption support program P, it is possible to prevent having illegitimate references in which the decryption support program is abused.

26 Claims, 14 Drawing Sheets

U.S. PATENT DOCUMENTS

| | | |
|---|---|---|
| 6,052,780 A | 4/2000 | Glover |
| 6,405,316 B1 | 6/2002 | Krishnan et al. |
| 2001/0034846 A1 | 10/2001 | Beery |
| 2001/0042209 A1 | 11/2001 | Sato |
| 2002/0016918 A1 | 2/2002 | Tucker et al. |
| 2002/0038428 A1 | 3/2002 | Safa |

FOREIGN PATENT DOCUMENTS

| | | |
|---|---|---|
| AU | 200053403 | 10/2000 |
| EP | 0 908 810 | 4/1999 |
| JP | 9-6232 | 1/1997 |
| JP | 11-39156 | 2/1999 |
| WO | 97/03398 | 1/1997 |

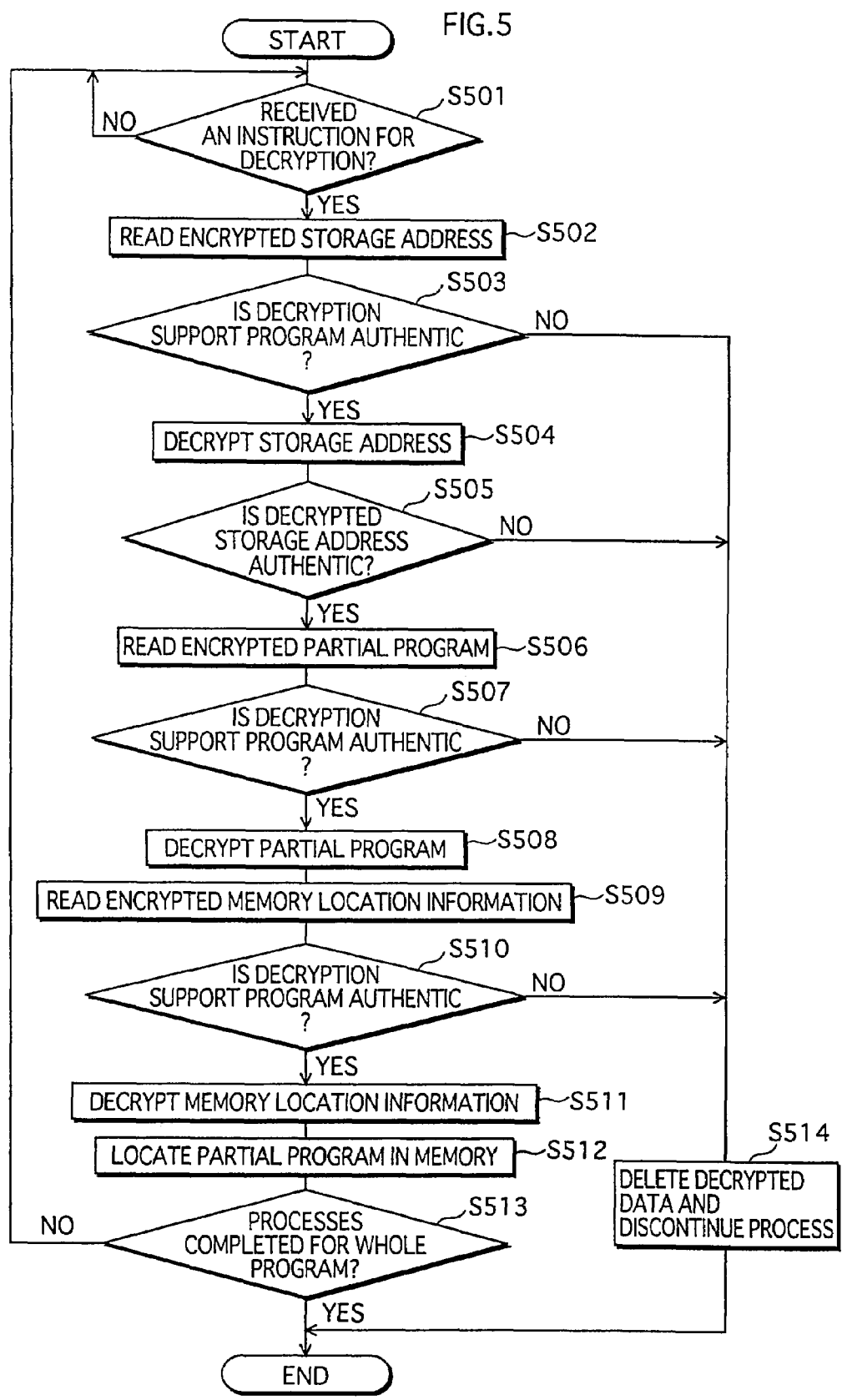

FIG.7
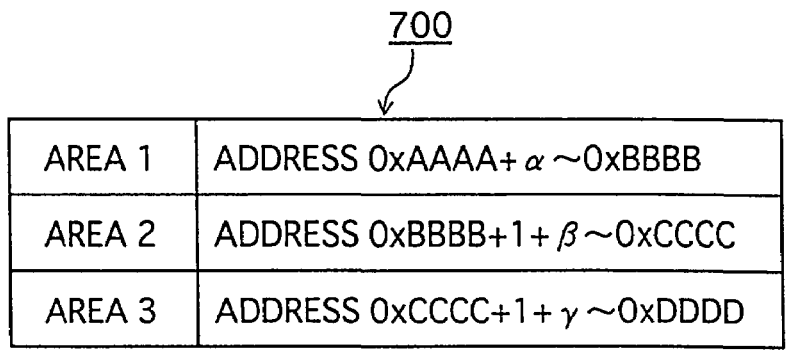
| AREA 1 | ADDRESS 0xAAAA+$\alpha$ ~0xBBBB |
| AREA 2 | ADDRESS 0xBBBB+1+$\beta$ ~0xCCCC |
| AREA 3 | ADDRESS 0xCCCC+1+$\gamma$ ~0xDDDD |
$$\begin{cases} 0< \alpha +\text{size} < \text{0xBBBB} \\ 0< \beta +\text{size} < \text{0xCCCC} \\ 0< \gamma +\text{size} < \text{0xDDDD} \end{cases}$$
FIG.8
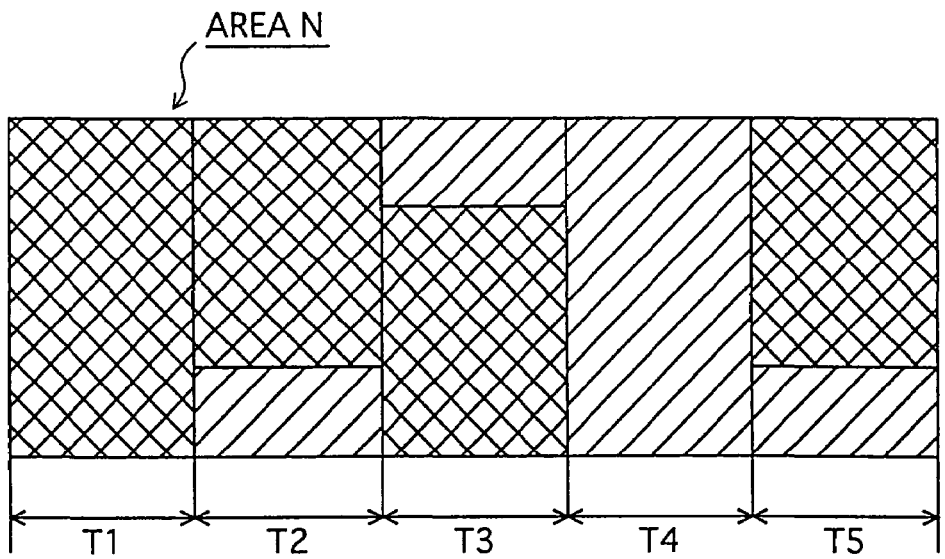
AREA N
T1  T2  T3  T4  T5
 : PARTIAL PROGRAM
 : DUMMY PROGRAM

ORDER OF PROGRAM EXECUTION

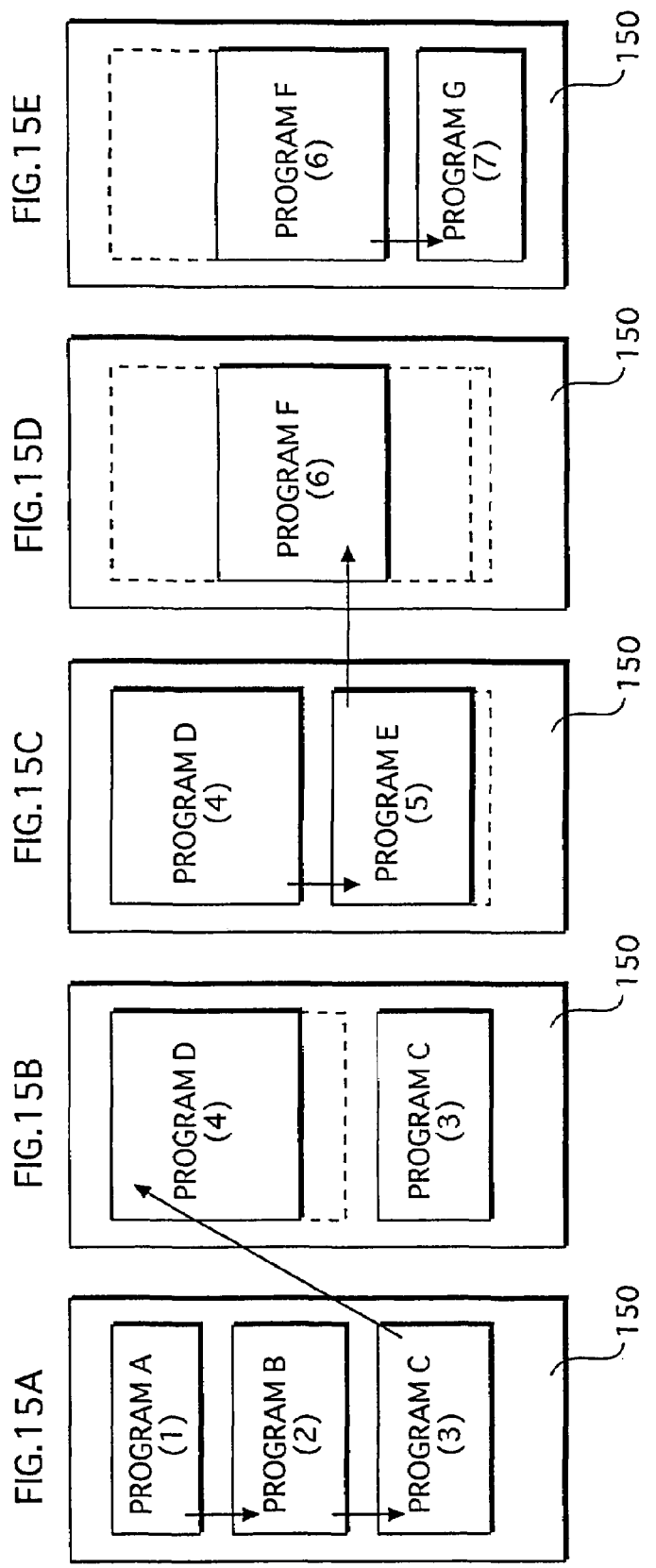

FIG.16A

| IDENTIFICATION INFORMATION | START ADDRESS | SIZE | ORDER OF BEING LOCATED |
|---|---|---|---|
| PROGRAM A | 0xAAAAA | 2000 | 1 |
| PROGRAM B | 0xBBBBB | 3000 | 2 |
| PROGRAM C | 0xCCCCC | 4000 | 3 |

| IDENTIFICATION INFORMATION | START ADDRESS | SIZE | ORDER OF BEING LOCATED |
|---|---|---|---|
| PROGRAM D | 0xAAAAA | 5000 | 4 |
| PROGRAM E | 0xDDDDD | 3000 | 5 |

| IDENTIFICATION INFORMATION | START ADDRESS | SIZE | ORDER OF BEING LOCATED |
|---|---|---|---|
| PROGRAM F | 0xEEEEE | 4000 | 6 |
| PROGRAM G | 0xFFFFF | 2000 | 7 |

↑1601   ↑1602   ↑1603   ↑1604

APPARATUSES AND METHODS FOR DECRYPTING ENCRYPTED DATA AND LOCATING THE DECRYPTED DATA IN A MEMORY SPACE USED FOR EXECUTION

This application is a divisional of U.S. application Ser. No. 10/630,674, filed Jul. 31, 2003 now U.S. Pat. No. 7,228,423, now allowed.

BACKGROUND OF THE INVENTION

1. Field of the Invention

The present invention relates to encrypted-data decrypting apparatuses that decrypt encrypted data, particularly when a program is executed or used, and further to decrypting apparatuses that decrypt encrypted data while realizing security protection, as well as to such decrypting methods.

2. Description of the Related Art

Conventionally, when data and program that have been encrypted for security purposes are decrypted to be reproduced or executed on a computer system, a decryption support program is executed on the computer system; however, in an open computer system whose specification is open to the public, programs can be easily analyzed and altered. Thus, some illegitimate acts are possible such as (i) to alter a decryption support program and (ii) to change a decrypted program, which is not supposed to be referred to or altered, into one that is referable or alterable.

In order to enhance security protection, other methods have been suggested in which, for example, the decryption support program itself is encrypted, and when data decryption is performed, the decryption support program gets decrypted (Japanese Unexamined Patent Application Publication NO. 09-006232), and authenticity of the decryption support program is checked before the decryption process starts (Japanese Unexamined Patent Application Publication NO. 11-039156). In these cases, it is arranged so that alteration of decryption support programs is prevented in order to protect security of the decrypted programs and data.

Even if the decryption process is performed by executing an authentic decryption support program, when the control is taken over with use of an illegitimate interruption and the like after a decrypted program or data has been loaded into a memory in the computer system, the loaded program or data becomes referable or alterable, and the security cannot be protected.

SUMMARY OF THE INVENTION

In view of the problems mentioned above, a main object of the present invention is to provide an encrypted-data decrypting apparatus and method that enhance security during the process from decryption to execution of encrypted programs and data, and further provide an encrypted-data decrypting apparatus and method that realize security protection by preventing illegitimate references and alteration, or limiting illegitimate references to a minimum level, with regard to programs or data that have been decrypted and loaded into a memory.

In order to achieve the object, the present prevention provides an encrypted-data decrypting apparatus that decrypts, for a purpose of execution on a computer system, a program that has been encrypted and stored, the encrypted-data decrypting apparatus comprising: a storing unit operable to store therein the program as a plurality of partial programs having been encrypted; a memory location information generating unit operable to generate, for each of the partial programs, memory location information including (i) timing information indicating a timing of decryption and (ii) positional information indicating into which location area each partial program is to be located after being decrypted, the location area being included in a memory space used for the execution of the program; a decrypting unit operable to sequentially read, from the storing unit, and decrypt the partial programs according to the timing information; and a loading unit operable to locate each of the decrypted partial programs into each location area indicated by the positional information.

With this arrangement, only part of the program is located in the memory used for execution of the program; therefore, it is possible to minimize the damage even if a situation arises where the data in the memory illegitimately gets referred to by abuse of interruption. Also, by arranging it so that the positional information in the memory location information, for at least one of the partial programs, gets overwritten into a location area where another partial program has been located prior to the decryption of the at least one partial program, it is possible to shorten the time period during which a particular partial program exists in the memory used for the execution of the program, and to make it more difficult for the partial program to be referred to in an illegitimate fashion.

The present invention also provides an arrangement wherein the positional information is stored after being encrypted, and the loading unit decrypts the positional information so that each of the decrypted partial programs gets located into each location area according to the decrypted positional information.

With this arrangement, it is possible to prevent a situation where the position into which the decrypted partial program has been loaded may be revealed through an illegitimate reference to the memory location information; therefore, it is possible to enhance security for the program having been loaded into the memory.

The present invention further provides an arrangement wherein at a time of locating each partial program into a location area, when a size of the location area is larger than a size of the partial program, the loading unit writes dummy data into a space area, which is a portion of the location area that has not been overwritten because of a difference between the sizes.

With this arrangement, it is possible to prevent a situation where such a portion of a partial program that does not get deleted in the overwriting process remains in the memory for a long time; therefore, it is possible to reduce the risk of having such a portion of a partial program gets referred to in an illegitimate fashion.

The present invention further provides an arrangement wherein when a predetermined length of time elapses after one partial program located into a location area finishes being executed before another partial program gets located into the location area, the loading unit deletes the one partial program.

With this arrangement, it is possible to prevent a situation where a partial program that finishes being processed remains in the memory for a long time; therefore, it is possible to reduce the risk of the partial program gets referred to in an illegitimate fashion.

The present invention also provides the encrypted-data decrypting apparatus further comprising a key embedding unit operable to embed into at least one of the partial programs, in advance during a process of program encryption, part or all of an encryption key used in a decryption process of another partial program, wherein the decrypting unit performs the decryption process of this other partial program, using the encryption key embedded in the at least one partial program that has already been decrypted and located in the memory space.

With this arrangement, even if an illegitimate user takes over the control of the system and attempts to have a particular partial program loaded into the memory in order to referred to it illegitimately, since the other partial program that has an encryption key required for the decryption of this particular partial program does not exist in the memory, the illegitimate reference is not possible.

Additionally, in order to achieve the similar advantageous effects, it is also acceptable that the encrypted-data decrypting apparatus further comprises a program embedding unit operable to embed into at least one of the partial programs, in advance during a process of program encryption, an encryption key generating program for generating part or all of an encryption key used in a decryption process of another partial program, wherein the decrypting unit performs the decryption process of this other partial program, using the encryption key generated through execution of the encryption key generating program embedded in the at least one partial program that has already been decrypted and located in the memory space, or that the encrypted-data decrypting apparatus further comprises an encryption-key-for-a-key embedding unit operable to embed into at least one of the partial programs, in advance during a process of program encryption, an encryption-key-for-a-key that is used to decrypt an encryption key which is to be used in a decryption process of another partial program, wherein the decrypting unit performs the decryption process of this other partial program, using the encryption key decrypted with the encryption-key-for-a-key obtained from the at least one partial program that has already been decrypted and located in the memory space.

Further, it is also possible to have an arrangement wherein the loading unit dynamically determines an absolute address of each location area before one of the partial programs that is to be decrypted first gets located into the memory space.

With this arrangement, the position in the memory into which the program is loaded changes every time the program is executed; therefore, even if an illegitimate user attempts to refer to the contents of a program in an illegitimate fashion by observing the contents of the memory while conjecturing the loading position, the possibility of the attempt being successful is low.

The present invention also provides an arrangement wherein the decrypting unit decrypts each partial program with use of a decryption support program, the encrypted-data decrypting apparatus further comprises a decryption program confirming unit operable to confirm authenticity of the decryption support program, and the decrypting unit has the decryption program confirming unit confirm the authenticity of the decryption support program before decrypting each partial program, and decrypts each partial program only after the authenticity is confirmed.

With this arrangement, it is impossible to refer to the contents of the program in an illegitimate fashion through an abuse of the decryption support program; therefore, it is possible to improve the security level at times of decryption.

It is also acceptable to have an arrangement wherein the encrypted-data decrypting apparatus further comprises an illegitimate access preventing unit operable to, when detecting an interruption, perform an illegitimate access preventing process by deleting one or more partial programs that are already located in the memory space.

With this arrangement, it is impossible to refer to the contents of the program in an illegitimate fashion through an abuse of interruption.

In addition, it is also possible to have an arrangement wherein the illegitimate access preventing unit has a dummy program executed when performing the illegitimate access preventing process.

Also by having an arrangement wherein the illegitimate access preventing unit receives in advance a registration of one or more positions at each of which an interruption for legitimate program checking occurs, and does not perform the illegitimate access preventing process when the detected interruption has occurred at one of the registered positions, it is possible to avoid inconvenience caused by a situation where even legitimate interruptions have to be prohibited in order to prevent illegitimate references.

It is also acceptable that the encrypted-data decrypting apparatus further comprises a storing position information storing unit operable to store therein storing position information that has been encrypted and indicates, for each of the partial programs, a storing position in the storing unit, wherein the decrypting unit reads, from the storing unit, and decrypts each of the partial programs according to the storing position information which the decrypting unit has read from the storing position information storing unit and decrypted.

With this arrangement, only legitimate partial programs will be executed. In other words, it is possible to prevent an illegitimate reference performed by an illegitimate user who executes a program that is for the purpose of the illegitimate reference and has been stored into a storage device in lieu of the legitimate partial program. In addition, it is also acceptable that the encrypted-data decrypting apparatus further comprises a storing position information authenticating unit operable to judge if the storing position information is authentic, wherein when the storing position information authenticating unit judges affirmatively, the decrypting unit reads, from the storing unit, and decrypts each of the partial programs.

Additionally, the present invention further provides an encrypted-data decrypting apparatus that decrypts, for a purpose of execution on a computer system, a program that has been encrypted and stored, the encrypted-data decrypting apparatus comprising: a storing unit operable to store therein the program as a plurality of partial programs having been encrypted; a decrypting unit operable to read one of the partial programs being an execution target from the storing unit and decrypt the read partial program; a memory location determining unit operable to dynamically determine a location position of the partial program being the execution target, the location position indicating an address in a memory space used for the execution of the program; and a loading unit operable to locate the decrypted partial program into the location position determined by the memory location determining unit.

With this arrangement, the position in the memory into which the program gets located changes every time the program is executed; therefore, even if an illegitimate user attempts to refer to the contents of a program in an illegitimate fashion by observing the contents of the memory while conjecturing the loading position, the possibility of the attempt being successful is low.

Further, it is effective to have an arrangement wherein the memory location determining unit determines a location position for each of at least one of the partial programs, so that one partial program gets overwritten into an area that is included in the memory space and where one or more other partial programs have already been located. In order to make having illegitimate references even more difficult, it is acceptable that the encrypted-data decrypting apparatus further comprises an execution-purpose memory determining unit operable to dynamically determine, before the execution of the programs tarts, one or both of a start address and a size of the memory space. It is also desirable to have an arrangement wherein when the memory location determining unit determines a location position of a partial program so that the partial program gets overwritten into an area where one or more other partial programs have already been located, the location position is determined so that the partial program overwrites such a partial program that has been located into the memory space earliest, or an arrangement wherein when the memory location determining unit determines a location position of a partial program so that the partial program gets overwritten into an area where one or more other partial programs have already been located, the location position is determined so that the partial program partially or completely extends over two or more other partial programs that have been located.

Further, the advantageous effects mentioned here may be achieved through (i) an encrypted-data decrypting method executed by the encrypted-data decrypting apparatus having the features mentioned above, or (ii) a program that has a computer execute this decrypting method. Additionally, the following items are also useful in achieving the advantageous effects mentioned above: the program which generates the memory location information and encryption key, the encryption key, and the encrypted-program generating device that encrypts the program while generating the "encryption key for a key", all of which are utilized by the encrypted-data decrypting apparatus having the aforementioned features.

BRIEF DESCRIPTION OF THE DRAWINGS

These and other objects, advantages and features of the invention will become apparent from the following description thereof taken in conjunction with the accompanying drawings which illustrate a specific embodiment of the invention.

In the drawings:

FIG. 5 is a flow chart that shows the operation of the program loader in the decryption and loading processes of an encrypted program in the present embodiment;

FIG. 7 shows other examples of area address information;

FIG. 8 is a conceptual drawing to show the general structure of the dummy data embedding process along a time line;

FIGS. 15A to 15E are conceptual drawings to show how decrypted partial programs in the modification example are located in the shared memory M;

FIG. 16 shows the contents of the memory managing information in the modification example.

DESCRIPTION OF THE PREFERRED EMBODIMENTS

The following describes an embodiment of an encrypted-data decrypting apparatus of the present invention, with reference to the drawings.

General Structure

Figure 1:
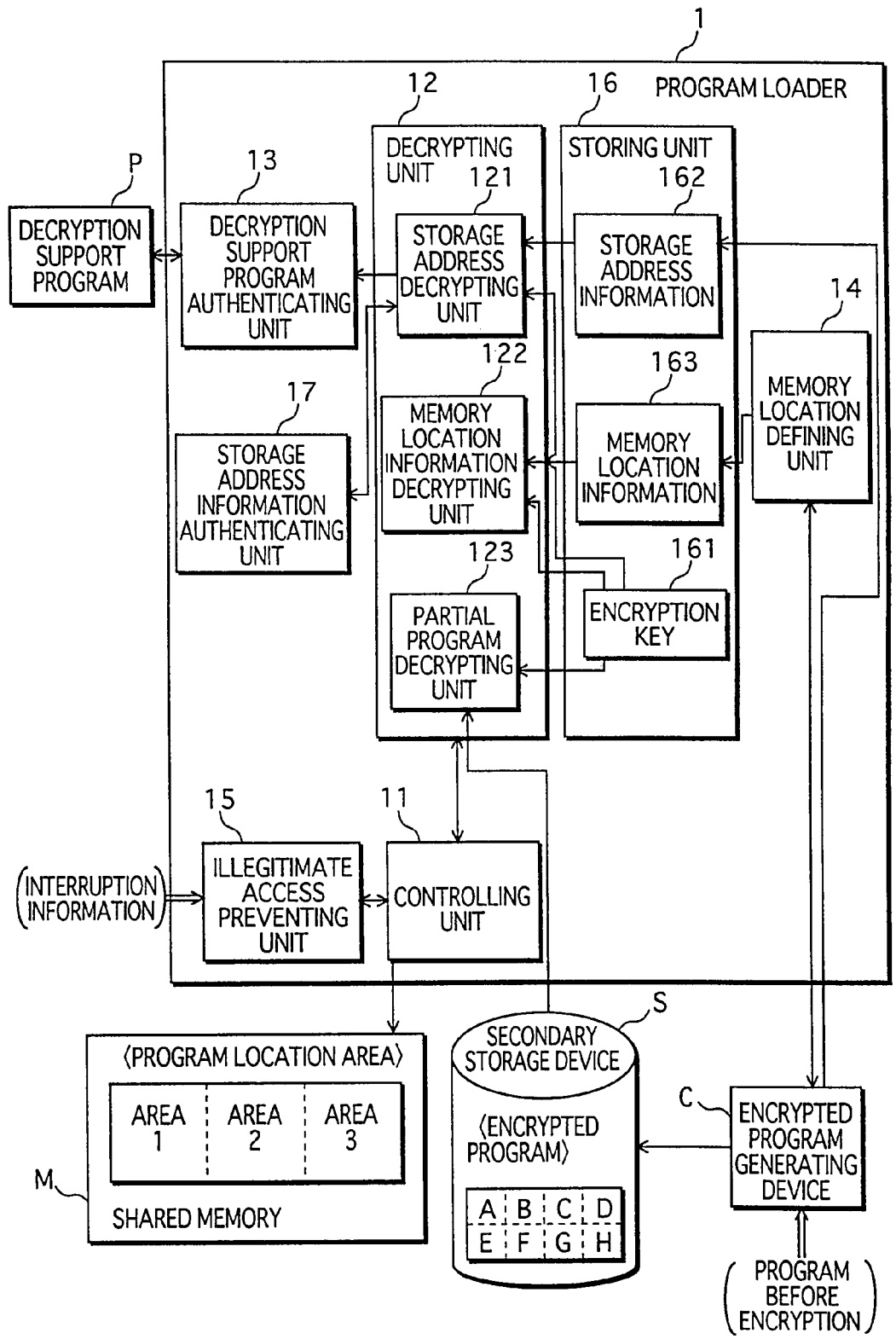
FIG. 1 is a block diagram of the structure of a program loader, which is an embodiment of the encrypted-data decrypting apparatus of the present invention, shown in a computer system in which the program loader operates.

FIG. 1 is a block diagram for the structures of a program loader 1, which is an embodiment of the encrypted-data decrypting apparatus of the present invention, and related devices, shown with other devices in a computer system in which the program loader and the related apparatuses operate. In the present embodiment, encrypted data to be decrypted by the encrypted-data decrypting apparatus is a program.

The program loader 1 in the present embodiment, according to an instruction from an operation system (hereafter, referred to as the OS), reads an encrypted program from a secondary storage device S and decrypts it and then loads it into a shared memory M used for execution. To "load" means to locate a program into a memory space in order to execute it.

The characteristics of the program loader 1 lie in using the overlay method, which is conventionally a technique used for managing memories, in order to protect security of encrypted programs. The overlay method is a technique used to store a program into a memory that is smaller in size than the program. The overlay method is to divide program into segments (hereafter referred to as "partial programs") and locate them into a same memory area at staggered times. Though there is a memory large enough for locating the whole program therein at the same time, the program loader 1 in the present embodiment purposefully employs the overlay method in order to realize security protection. In particular, the program loader 1 encrypts and stores the program in the form of a group of partial programs, and when the program needs to be executed, the program loader 1 decrypts the program in units of partial programs and loads them to a same area of the shared memory M by sequentially overwriting one with another. Further, since the position and timing of locating the partial programs are determined while confidentiality is taken into consideration, the security protection capability is higher that much.

The processes of decryption and loading are performed in units of partial programs, which denote an object code generated from a source file or a group of source files related to one another. More specifically, an object code denotes a subprogram, which is a program component, or a library module itself.

By loading program in segments like this, the possibility of having the contents of the whole program revealed in an illegitimate reference becomes small. This is because, in order to refer to the whole program, an illegitimate reference needs to be repeated every time a partial program is loaded.

It should be noted, however, that security protection is not considered in the overlay method because the original purpose of the overlay method is to save memory resources. Thus, a partial program that has finished being processed remains in the memory till it gets overwritten by a next partial program. Also, since the address of the area at which the program is loaded is fixed, it is easy to decipher the access to the program. In addition, it is possible to partially refer to or alter the program in an illegitimate way by abusing an interruption function or tampering the decryption support program.

The program loader 1 of the present embodiment executes the overlay processing method after arranging it so that security protection is taken into consideration, as well as checks if there is abuse of the interruption function or a tampering of the decryption support program.

Structure

General Structure

The following describes the structure of the program loader 1.

The program loader 1 comprises a controlling unit 11 that controls the overall process; a decrypting unit 12 that decrypts encrypted data including encrypted partial programs using a decryption support program P; a decryption support program authenticating unit 13 that checks authenticity of the decryption support program P prior to decryption; a memory location defining unit 14 that determines the position and timing of the locating of a decrypted partial program into the shared memory M; and an illegitimate access preventing unit 15 that prevents illegitimate access which can be made by having an interruption into the partial program being executed in the shared memory M.

Further, the program loader 1 comprises a storing unit 16 that stores therein various kinds of encrypted information used in the program decryption process and an encryption key; and a storage address information authenticating unit 17 that confirms authenticity of storage address information (will be explained later) stored in the storing unit 16. The decrypting unit 12 is made up of a storage address decrypting unit 121, a memory location information decrypting unit 122, and a partial program decrypting unit 123 that handle different kinds of data respectively.

The information stored in the storing unit 16 includes an encryption key 161 used in the decryption process; storage address information 162 that indicates a position in the secondary storage device S into which an encrypted partial program being a decryption target is to be stored; and a memory location information 163 that indicates a position in the shared memory M into which the decrypted partial program is to be stored.

The storage address information 162 is referred to, when the encrypted partial program being a decryption target is read from the secondary storage device S. Since the storage address information 162 is stored after having been encrypted, the storage address decrypting unit 121 decrypts it. Then, after the storage address information 162 is decrypted, the storage address information authenticating unit 17 checks its authenticity (checks whether it has not been tampered).

Figure 2:
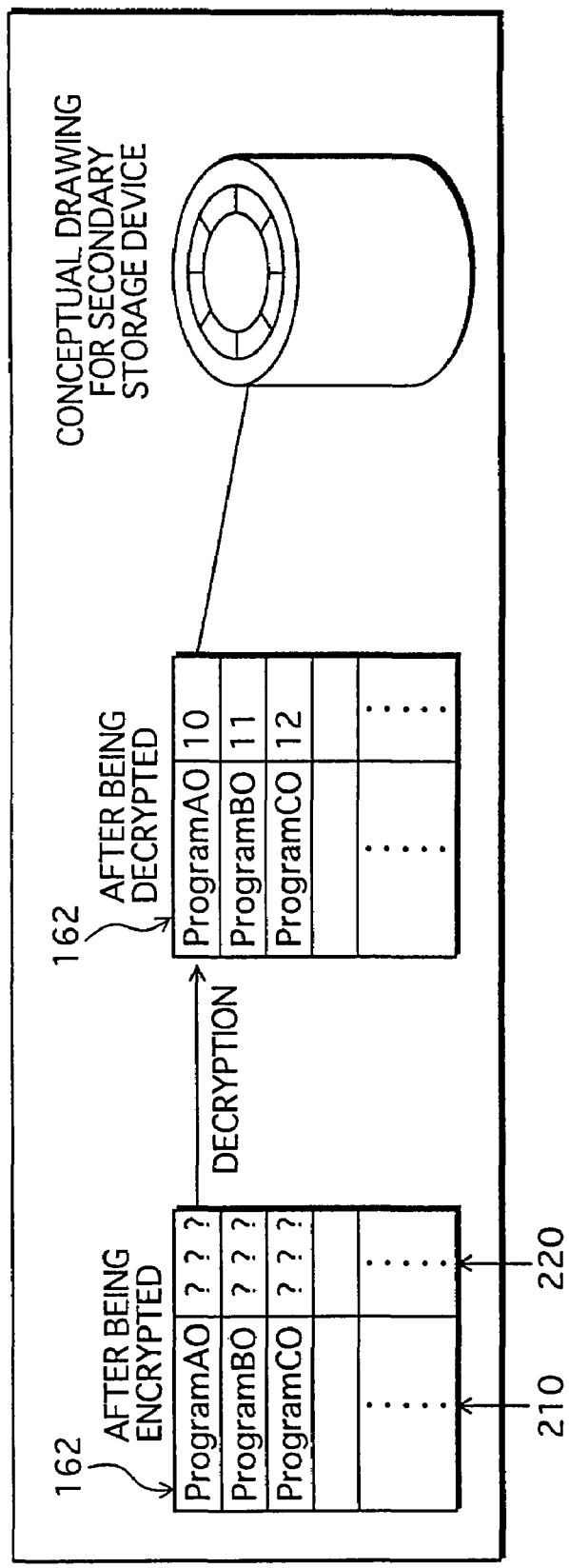
FIG. 2 is a conceptual drawing to show the correspondence in the embodiment between storage address information and storage locations of partial programs, the storage locations being in a secondary storage device and specified by the storage address information.

FIG. 2 is a conceptual drawing to show the correspondence between the storage address information 162 and storage locations of partial programs, the storage locations being in a secondary storage device S and specified by the storage address information 162. The storage address information 162 is made up of identification information 210 of the partial programs and address information 220 indicating at which positions the partial programs are each stored in the secondary storage device S. There are as many pieces of storage address information as the number of partial programs. The address information 220 portions are encrypted.

The memory location information 163 is information that defines at which position of the shared memory M each of the partial programs after being decrypted should be located. To have the locating positions defined in advance is a prerequisite for execution of the overlay method by which each piece of data is sequentially overwritten into a predetermined area. The memory location information 163 is stored after being encrypted, and gets decrypted when being referred to by the memory location information decrypting unit 122.

Figure 3:
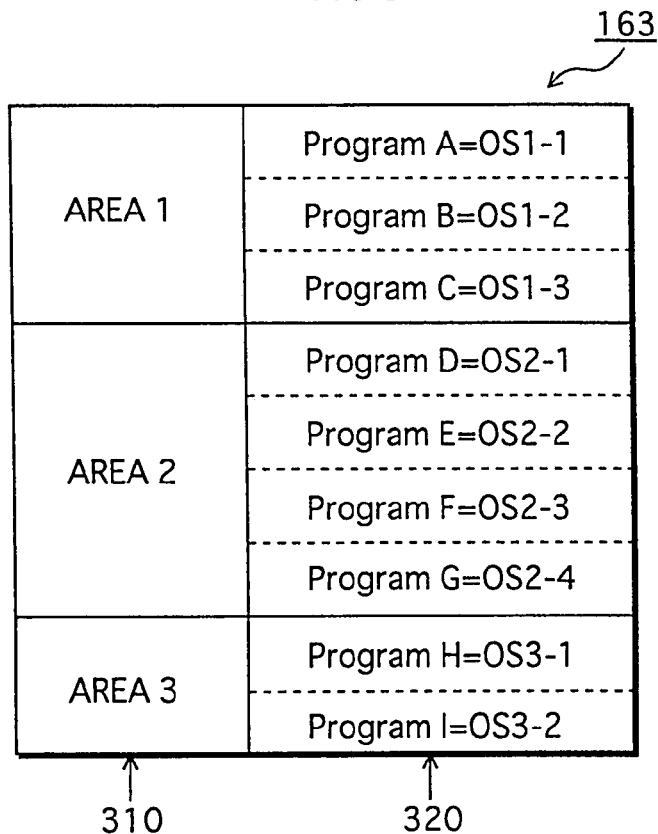
FIG. 3 is a conceptual drawing to show an example of the structure and the contents of the memory location information in the present embodiment.

FIG. 3 is a conceptual drawing to show an example of the structure and the contents of the memory location information. The memory location information indicates which program should be located in the shared memory M at which timing (i.e. in what order). The partial program storage region in the share memory M is divided into three areas.

The memory location information 163 shown in FIG. 3 is made up of area identification information portions 310 and partial program identification information portions 320. The area identification information portions 310 stores therein identification information that indicates to which area the information is related. The partial program identification information 320 stores therein (i) identification information of the partial program to be located into the area indicated by the identification information stored in the area identification information portion 310 and (ii) data that indicates in what order each partial program is to be located.

The memory location information 163 indicates that the partial program storage region in the shared memory M is divided into three areas, and that three partial programs can be sequentially located into the area 1, four partial programs into the area 2, and two partial programs into the area 3.

Figure 4:
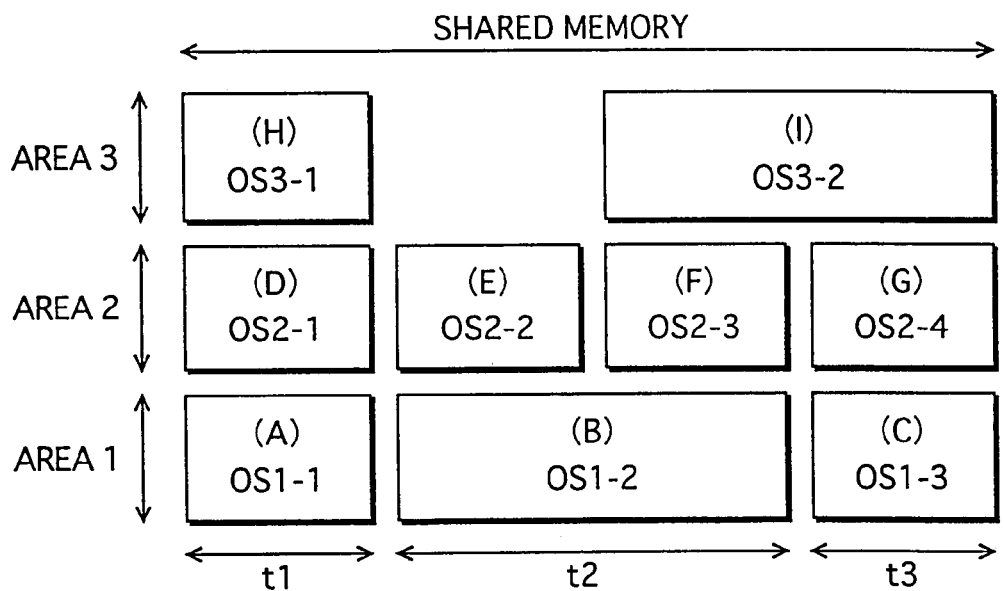
FIG. 4 is a conceptual drawing to show how the partial programs decrypted in the present embodiment are located in the shared memory.

FIG. 4 is a conceptual drawing to show how the partial programs decrypted are located into the shared memory M according to the memory location information 163 at the time of program execution. FIG. 4 shows the partial programs that are each located in one of the three storage areas in the shared memory M along the time line (horizontal axis) of the process execution of the program. For example, the partial programs A, B, and C are sequentially located in the area 1, and during the time period t1, the partial program A (the area 1), the partial program D (the area 2), and the partial program H (the area 3) coexist in the shared memory M. The partial programs that coexist in the share memory M in a same time period may have dependency with one another, for example, by calling a process in another partial program during the course of the process.

The memory location information as mentioned above is generated by the memory location defining unit 14 prior to the encryption process of the program being an encryption target. This generation process is basically the same as the generation process of the same type of location information used in the conventional overlay method; however, in the present embodiment, this generation process is performed in such a manner that takes security protection into consideration. The generation process in the present embodiment will be explained later.

Description of the Main Parts of the Structure

The following explains further in detail the main parts of the structure that has so far been explained in general.

Decryption Support Program Authenticating Unit 13

The decryption support program authenticating unit 13 confirms if the decryption support program P is authentic, prior to the decryption process of various kinds of encrypted data. More specifically, (i) when the partial program decrypting unit 123 is going to decrypt an encrypted partial program, (ii) when the storage address decrypting unit 121 is going to decrypt encrypted storage address information, and (iii) when the memory location information decrypting unit 122 is going to decrypt encrypted memory location information, the decryption support program authenticating unit 13 performs an authenticating process of the decryption support program P in response to a request from each of these components. The decryption support program authenticating unit 13 returns the result of the authenticating process to the source of the request. When the result of the authentication is "authentic (not tampered)", the decryption support program authenticating unit 13 receives data being a decryption target from the source of the request and transmits it to the decryption support program P, and then receives the outcome of the decryption process from the decryption support program P and transmits it to the source of the request.

The authentication process performed by the decryption support program authenticating unit 13 is to confirm that the decryption support program P has not been tampered between the last time the program was executed and the present time. For the judgment of authenticity, some items including the following will be referred to: (i) whether the size of the decryption support program P has changed, (ii) dates and times of updates, and (iii) one-way hash values of the decryption support program P. It should be noted that the method of authentication is not limited to this, and it is also acceptable to use a technique used in methods of authenticating electronic signatures. In order to perform this authenticating process, the decryption support program authenticating unit 13 stores therein the size of the decryption support program P at the time of the first execution and information on dates and times of updates as well as hash values.

The Storage Address Information Authenticating Unit 17

The storage address information authenticating unit 17 confirms if storage address information is authentic, the storage address information having been decrypted by the decryption support program P according to an instruction from the storage address decrypting unit 121. This is to confirm that the storage address information has not been tampered between the last time it was executed and the present time.

The storage address information authenticating unit 17 performs the authenticating process of the storage address information using an authentication technique that is normally used such as a one-way hash function, and returns the result to the storage address decrypting unit 121. In order to perform this authenticating process, the storage address information authenticating unit 17 stores therein information that is necessary concerning the storage address information (the hash value at the time of the first decryption and other pieces of information in general used in the authenticating process).

The Controlling Unit 11

When the OS specifies which partial program is to be decrypted, the controlling unit 11 transmits identification information of the partial program to be decrypted to the storage address decrypting unit 121, and instructs the storage address decrypting unit 121 to obtain and decrypt the storage address of the partial program. When the storage address decrypting unit 121 outputs the decrypted storage address, the controlling unit 11 transmits it to the partial program decrypting unit 123, and instructs the partial program decrypting unit 123 to decrypt the partial program. In parallel with this, the controlling unit 11 transmits identification information of the partial program being the decryption target to the memory location information decrypting unit 122, and instructs the memory location information decrypting unit 122 to decrypt memory location information for the partial program.

The controlling unit 11 loads the decrypted partial program that has been outputted by the partial program decrypting unit 123 into one of the areas in the shared memory M according to the memory location information outputted by the memory location information decrypting unit 122. As shown in FIG. 3, the memory location information is made up of identification information of each partial program and identification information of each area, and there is no information included that indicates an absolute address value of each area. The absolute address value of each area is stored in the controlling unit 11.

During the course of the process mentioned above, when there is a problem with the decryption support program P or the storage address information (when one or both of these were confirmed not to be authentic), the controlling unit 11 instructs other components to discontinue the process and performs a process of deleting various kinds of data (partial programs, memory location information, and storage address information) that have been so far decrypted at that point.

Memory Location Defining Unit 14

At the time of encrypting the partial program, the memory location defining unit 14 generates and stores into the storing unit 16, the memory location information 163 that is referred to in the decryption process mentioned above. The partial program is encrypted by the encrypted-program generating device C. The encrypted-program generating device C converts the program (a group of partial programs) being an encryption target into an execute form, and encrypts the converted program before storing it into the secondary storage device, so that each partial program is to be located in the memory in the order that is specified in the memory location information.

First, the memory location defining unit 14 obtains, from header information and the like, various kinds of information that are necessary for determining the locations in the memory for the partial programs. Further, the memory location defining unit 14 obtains such criteria that should be considered important at the time of determination (the ones that are specified as parameters by a system administrator), including information about the shared memory M (e.g. the partial program storage region and the number of areas included therein and their sizes) in which the partial program is to be located at the time of execution. The memory location defining unit 14 generates memory location information from these kinds of information. More specifically, the memory location defining unit 14 refers to the information as follows, when generating the memory location information:

(1) The size of each partial program (the size before encryption, i.e. the size after decryption)

(2) Dependency between the partial programs (the relationship between the partial program that calls and the partial program that is called, and the number of calls)

(3) The level of confidentiality of each partial program (4) The level of performance required The process of determining locations in the memory according to these pieces of information is also performed in the conventional overlay process; however, in the present embodiment, since security protection of the program is targeted, the item (3) is considered to be more important, and the item (4) has a lower priority, compared to the case where memory location is determined under the normal overlay method.

Accordingly, the memory location defining unit 14 generates such memory location information by which the loading and the deleting processes for a partial program having a high level of confidentiality are repeated frequently so that such a partial program is located in the shared memory M for a minimum length of time period and gets overwritten by another partial program as soon as the process is finished. The levels of confidentiality of partial programs may be specified, for example, through evaluation of each partial program by a system administrator, wherein the evaluation values of confidentiality are inputted into the memory location defining unit 14 as parameters.

In addition, it is also possible to specify memory location information in the following manner: The memory location defining unit 14 generates a plurality of patterns of location information as candidates, using algorithms that are conventionally used for determining memory location information. Then, the plurality of location information candidates are evaluated according to criterion set in view of security protection, and the best one will be specified as the location information. One of the criteria is, for example, "the estimated length of time period during which a partial program having a high level of confidentiality will exist in the memory". Alternatively, it is also acceptable that a system administrator refers to the plurality of location information candidates generated by the memory location defining unit 14 and selects one from among them.

Further, when it is necessary to make smaller the total value of the sizes of the partial programs deployed in the memory at the same time (the size of the part of the program that is referable at a time), it would be best to make smaller the size of the memory into which the partial programs are loaded.

It should be noted that the memory location defining unit 14 may be a constituent of the encrypted-program generating device C instead of a constituent of the program loader 1.

The Illegitimate Access Preventing Unit 15

The illegitimate access preventing unit 15 performs processes for preventing illegitimate program analysis that can be made using interruptions in order to analyze the partial program executed in the shared memory M.

An interruption means that, during one process is executed on the computer system, another event having a higher priority occurs. Generally speaking, when an interruption occurs, the process being executed gets discontinued temporarily and another process for the interrupting event will be performed. By taking advantage of this function, it is possible to discontinue a program at a point arbitrarily selected, and refer to the contents of the memory or a register at that point, or to have the processing resume after altering the contents of the memory or a register.

For example, by having an interruption occur immediately after the program loader 1 decrypts the storage address information, it is possible to refer to the decrypted storage address information. Also, by having an interruption occur after the decryption and the loading of a partial program are completed, it is possible to refer to the contents of the partial program located in the shared memory M.

In order to prevent such situations, the illegitimate access preventing unit 15 discontinues the process being executed by another component or deletes the partial program loaded into the shared memory M, upon detection of an interruption.

More specifically, upon detection of an interruption, the illegitimate access preventing unit 15 issues a trap instruction which is to discontinue the process of the program being executed on the computer system that includes the program loader 1 therein, and refers to an IDT (Interrupt Descriptor Table) in the CPU. An IDT is a table that defines information about handlers that correspond to interruption instructions. In the present embodiment, such handlers are defined that are used for executing discontinuation of a program and deleting of the contents stored in the decrypted partial program storage region of the shared memory M. The illegitimate access preventing unit 15 shifts the process to such a handler so that discontinuation of the program and deletion of the memory contents are executed.

Also, in parallel with the process mentioned above, the illegitimate access preventing unit 15 performs a process for executing dummy programs. Dummy programs are used to distract the person who attempts to take over the control with abuse of interruptions, while the program is discontinued or the memory contents are deleted. Here, it is assumed that the process of a dummy program is one that does not affect the processes of other programs, for example, "display only character strings" or "output a result that is opposite of a result of execution of an encrypted program". When detecting an interruption, the illegitimate access preventing unit 15 calls a dummy program that has been loaded into the execution environment in advance and has it executed.

Operation

Next, the following explains the operation of the program loader 1 that has the structure as mentioned above, with reference to the drawings, and with a focus on description of the controlling unit 11.

FIG. 5 is a flow chart that shows the operation of the program loader 1 in the decryption and loading processes of an encrypted program. It should be noted, however, that the process performed by the illegitimate access preventing unit 15 is not shown in the drawing since it is executed in an interruptive manner. Also, the process of encrypting the program and the process of generating the memory location information to be performed in parallel are not shown in the drawing, either.

The process of decryption and loading starts when the controlling unit 11 has received an instruction for executing the process (which includes identification information that specifies a partial program to be processed) from the outside (the OS or a program being executed on the system) (S501: Yes). The instruction for executing the process is transmitted from the OS when the target program is activated and when, after the activation, the partial program being executed after having been decrypted and loaded calls another partial program. With an instruction at the time of activation, the partial program that has an entry point of the program is the decryption target. With an instruction after the activation, the identification information of the partial program being called is the target of the process.

Receiving the instruction, the controlling unit 11 transmits the identification information of the specified partial program to the storage address decrypting unit 121 and instructs it to decrypt the storage address so that the specified partial program is read from the secondary storage device S.

Having received the instruction from the controlling unit 11, the storage address decrypting unit 121 reads the storage address information (being encrypted) for the partial program from the storing nit 16 (S502), and also instructs the decryption support program authenticating unit 13 to confirm if the decryption support program P is authentic.

When the decryption support program P is confirmed to be authentic (S503: Yes), the storage address decrypting unit 121 decrypts the storage address information read in Step S502 using the decryption support program P. At this time, the storage address decrypting unit 121 obtains, from the storing unit 16, an encryption key for decrypting this storage address information, and transmits the encryption key and the encrypted storage address information to the decryption support program P so that the decryption process is performed (S504).

Conversely, when the decryption support program is confirmed not to be authentic (when judged to have been tampered) (S503: No), the decryption support program authenticating unit 13 informs the controlling unit 11 of the judgment result. The controlling unit 11 informs the OS of the detection of the tampering and discontinues the processes of decryption and loading (S514).

The storage address decrypting unit 121, which has obtained in Step S504 the decrypted storage address information, transmits it to the storage address information authenticating unit 17, so that the authentication process is performed. The storage address information authenticating unit 17 performs the authenticating process using an authentication technique that is normally used such as a one-way hash function, and returns the result to the storage address decrypting unit 121. The storage address decrypting unit 121 transmits the result to the controlling unit 11.

When the storage address information is confirmed not to be authentic as a result of the authentication process (S505: No), the controlling unit 11 informs the OS that "the storage address is illegitimate", and discontinues the processes of decryption and loading (S514).

On the other hand, when the storage address information is confirmed to be authentic (S505: Yes), the controlling unit 11 obtains, from the storage address decrypting unit 121, the decrypted storage address information. Then, the controlling unit 11 goes on to the processes of reading, from the secondary storage device S, and decrypting the partial program being a target of decryption and loading. More specifically, at first, the controlling unit 11 instructs the partial program decrypting unit 123, which is to execute the decryption process, to start the process.

Having received the instruction from the controlling unit 11, the partial program decrypting unit 123 at first reads, from the storage position in the secondary storage device S, the specified encrypted partial program and an encryption key for decrypting the partial program (S506). Then, the partial program decrypting unit 123 instructs the decryption support program authenticating unit 13 to perform an authenticating process of the decryption support program P, and returns the result to the controlling unit 11.

When the decryption support program P is confirmed to be authentic (S507: Yes), the partial program decrypting unit 123 transmits the encrypted partial program obtained in Step S506 with the encryption key to the decryption support program P so that the decryption process of the partial program is performed (S508).

Conversely, when the decryption support program P is confirmed not to be authentic (S507: No), the partial program decrypting unit 123 informs the controlling unit 11 of the result. The controlling unit 11 informs the OS that "tampering of the decryption support program has been detected" and discontinues the processes of decryption and loading of the partial program. Also, at this time, if there is any decrypted partial program that has already been loaded into the shared memory M, the controlling unit 11 deletes it as well as deletes the decrypted storage address (S514).

Having finished the decryption process of the partial program, the partial program decrypting unit 123 outputs the decrypted partial program to the controlling unit 11. The controlling unit 11 performs the process of locating the decrypted partial program into the space in the shared memory M. More specifically, at first, the controlling unit 11 instructs the memory location information decrypting unit 122 to read the encrypted memory location information and the encryption key from the storing unit 16 (S509).

The memory location information decrypting unit 122 has the decryption support program authenticating unit 13 perform an authenticating process of the decryption support program P.

When the decryption support program P is confirmed to be authentic (S510: Yes), the memory location information decrypting unit 122 transmits the encrypted memory location information and the encryption key to the decryption support program P so that the decryption process is performed, and returns the memory location information having been decrypted to the controlling unit 11 (S511). The controlling unit 11 locates the partial program decrypted in Step S508 into the shared memory M according to the decrypted memory location information (S512)

When the decryption support program P is confirmed not to be authentic in Step S510 (S510: No), the memory location information decrypting unit 122 informs the controlling unit 11 of the result. The controlling unit 11 deletes the partial program decrypted in Step S508, and discontinues the process (S514). In addition, if there is any partial program that has already been loaded into the memory space, the controlling unit 11 deletes it, too.

The processes so far mentioned will be repeated until the whole target program finishes being processed (S513: Yes).

SUMMARY

As so far mentioned, the program loader 1 of the present embodiment, using the overlay method, decrypts the encrypted program being a decryption target in units of partial programs, and, locates the decrypted partial programs into a predetermined area of the memory through an overwriting process according to the memory location information that has been set in consideration of security protection; and the program loader 1 thereby prevents an illegitimate reference of the whole program. Further, security protection is ensured more firmly through the following processes: (1) Check for illegitimate tampering of the decryption support program, by checking authenticity of the decryption support program every time each partial program is decrypted, (2) Make it difficult to illegitimately refer to the decrypted program, by encrypting also the memory location information that indicates where the decrypted partial programs are located in the memory, and (3) Prevent illegitimate references with abuse of interruptions, by deleting decrypted data (e. g. partial programs) when an interruption is detected.

MODIFICATION EXAMPLES

The following explains six modification examples that are possible for the embodiment mentioned above.

Modification Example 1

In the aforementioned embodiment, the illegitimate access preventing unit 15 judges all the interruptions to be illegitimate, and discontinues the process and deletes the decrypted data; however, there are some interruptions that are legitimate. In the present modification example, process is performed so that legitimate interruptions are accepted.

The structure of the overall encrypted-data decrypting apparatus in the present modification example is the same as the one in the aforementioned embodiment, and only part of the process performed by the illegitimate access preventing unit is different. Consequently, the drawing for the structure will be omitted, but the unit will be referred to as an illegitimate access preventing unit 15' for making a distinction.

The illegitimate access preventing unit 15' in the present modification example prevents inverse analysis of a program where an interruption is used in an illegitimate manner, while accepting interruptions for legitimate debuggers by allowing such interruptions that are related to debuggers for the purpose of checking on malfunction and the like, which is a legitimate purpose. Debugger is a function to halt (break) the process of a program at a desired position and make it possible to refer to or alter the memory contents in that state, in order to check on malfunction.

Halting a program through the breaking is performed by, in advance, setting break points at each of which a break occurs, and having an interruption occur so that the program is stopped every time the process comes to one of the break points. It is also possible to set detailed conditions that each work as a prerequisite for halting the program at each breakpoint. According to the processing method of the illegitimate access preventing unit 15 of the aforementioned embodiment, however, the program halts when the OS lets an interruption occur for the breaking; therefore, it is not possible to check on malfunction.

Accordingly, the illegitimate access preventing unit 15' of the present modification example distinguishes interruptions related to debuggers (interruptions for the breaking) from other interruptions in the following manner:

After a program being an encryption target is converted into an execute form by the encrypted-program generating device C, the illegitimate access preventing unit 15' receives, from a legitimately authorized user, setting of break points in the program, in the execute form while it is still at a before-encryption stage. The illegitimate access preventing unit 15' stores therein positional information (expressed in line numbers, name of functions, addresses etc.) of the break points having been set.

Then, at the stage of decryption and loading of the program, the illegitimate access preventing unit 15' watches for interruptions (in the same manner as the illegitimate access preventing unit 15 does). When an interruption occurs while the program is being executed, the illegitimate access preventing unit 15' compares the occurrence position with the breakpoint positional information having been stored. When the occurrence position matches one of the positions of the break points that have been set in advance in the breakpoint positional information, the process mentioned in the embodiment such as deleting the memory contents will not be performed, and the user is allowed to continue the execution.

Conversely, when an interruption has occurred at a position that is different from the positions set in advance, the illegitimate access preventing unit 15', just like the illegitimate access preventing unit 15, discontinues the execution of the program and performs the process of deleting the encrypted data such as partial programs in the memory M.

Modification Example 2

The following explains a modification example that more firmly ensures security protection of the memory location information.

In the aforementioned embodiment, the memory location information that once generated is repeatedly used with the same contents every time a target encrypted program is decrypted and loaded. In other words, when an encrypted program is executed, each of the partial programs constituting the program is located at the same address in the memory space at the same timing every time. Consequently, it is hard to say that there is no possibility that the contents of the memory location information may be decoded through repeated execution of the program while the data in the memory space is monitored. When the memory location information is decoded, illegitimate references with use of the information become possible.

The present modification example, therefore, is aiming at preventing the memory location information from being decoded, and ensuring security protection of the encrypted program. Thus, in the present modification example, the memory location information is generated so that memory location positions of the partial programs constituting the program change dynamically every time the program is executed.

More specifically, memory location information is set so that the absolute address value to be assigned to each of the three areas in the shared memory M changes every time the program is executed.

The structure of the overall encrypted-data decrypting apparatus in the present modification example is the same as the one in the aforementioned embodiment, and only part of the process performed by the memory location defining unit is different. Consequently, the drawing for the structure of the overall apparatus will be omitted, but the memory location defining unit in the present modification example will be hereafter referred to as a memory location defining unit 14' for making a distinction.

Figure 6A:
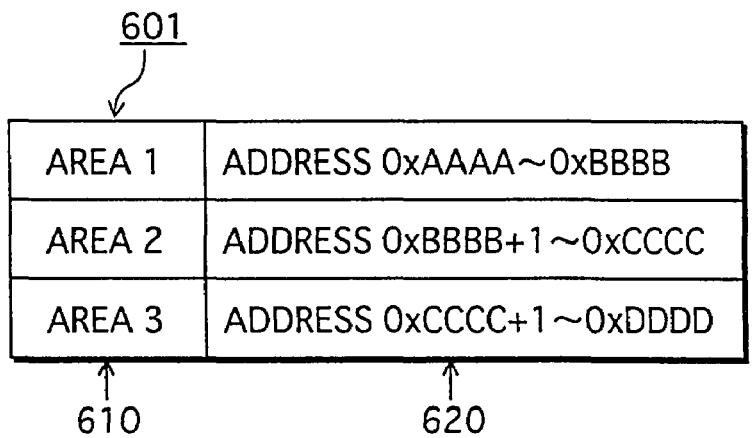
FIG. 6 shows examples of area address information.
Figure 6B:
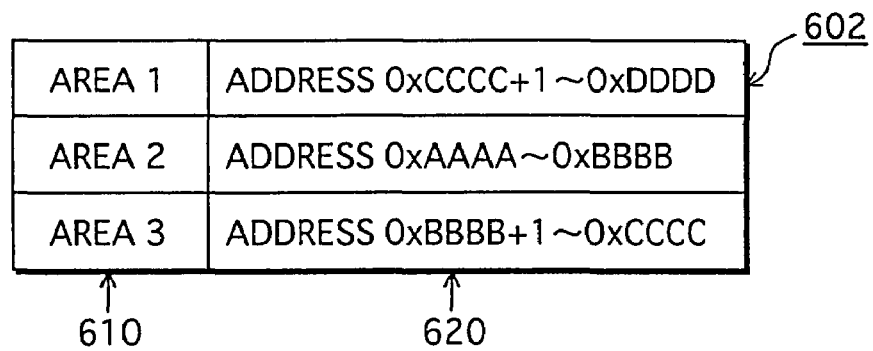
Figure 6C:
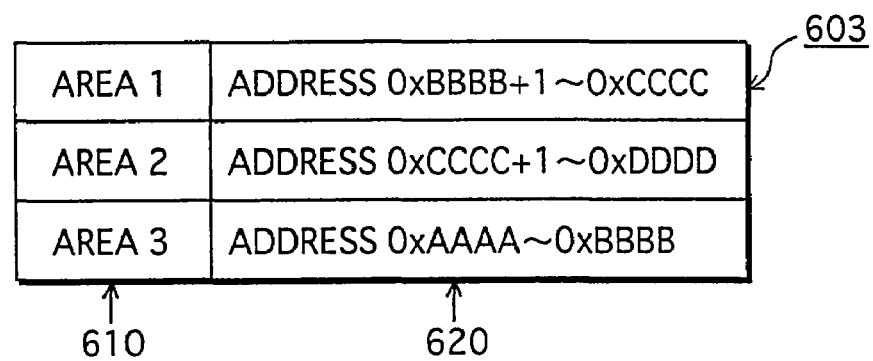

FIG. 6 shows three patterns of area address information 601, 602, and 603 that are stored by the memory location defining unit 14' and used for changing the address of the areas. Each piece of area address information is made up of a combination of an area and an absolute address assigned to the area, and has an area identifier portion 610 and an absolute address value portion 620.

In the aforementioned embodiment, the controlling unit 11 stores therein and uses only one kind of information that corresponds to the area address information (e. g. the area address information 610). In the present modification example, the memory location defining unit 14' selects one out of the three patterns of area address information and transmits it to the controlling unit 11 when the memory location information is generated. When a partial program is decrypted and loaded, the controlling unit 11 determines the absolute address of each area according to the selected pattern of area address information, and further obtains a location address in the shared memory M for the decrypted partial program according to the absolute address of each area and the memory location information.

The memory location defining unit 14' may select one pattern of area address information, either (i) when an instruction for executing the program is inputted to the program loader 1, or (ii) when the processes of decrypting and loading the program have started and before the first partial program gets loaded.

It should be noted that the absolute addresses of the areas do not necessarily have to be changed in the manner mentioned above where one pattern is changed to another. It is also possible to change the memory location positions by "sliding" the absolute addresses.

FIG. 7 shows area address information according to the method by which absolute address values are changed by being slid. In the area address information 700, an area and an absolute address value are in one-to-one correspondence, and each absolute address value includes a variant (a sliding width) that is one of α, β, and γ. The memory location defining unit 14' changes the absolute addresses of the areas by changing the value of each variant.

It is acceptable that the value of each variant is determined to be an arbitrary value with use of a random number generating program (e. g. a random number generating function, or one using the time information stored in the timer etc.). The value of each variant is determined so that a condition is satisfied that "the sum of the value of a variant (i.e. the sliding width) for an area and the size of the partial program to be located in the area is no greater than the size of the area". The reason for this is because a situation should be avoided where a partial program is located so as to be partially located outside the area when being slid.

It should be noted that it is also possible to arrange it so that the memory location defining unit 14' stores therein the area addresses used when the program was executed last time, and makes sure, by referring to them, that absolute addresses of the areas are different from the ones from the last time.

The changes of the area addresses may be performed by the controlling unit 11 by itself, instead of being performed by the controlling unit 11 according to the information stored by the memory location defining unit 14' as mentioned above.

Modification Example 3

The following explains a modification example that more firmly ensures security protection of the partial programs in the memory by preventing a particular partial program from being located in the shared memory M for a long time.

The reason why the overlay method, by which the partial programs are overwritten into the same areas, is used in the aforementioned embodiment is because the risk of having illegitimate references gets high when a particular partial program remains located in the shared memory for a long time; however, depending on the size of a partial program to be overwritten by another, a part of the partial program having been processed will remain in the memory without being deleted, even if the overlay method is used.

For example, when partial programs are located in the memory in the way shown in FIG. 4, as for the three partial programs that are sequentially located in the area 1, it is assumed that the partial program B and the partial program C each are only half the size of the partial program A that was located first. In that case, the latter half of the partial program A does not get deleted by the overwriting with the partial programs B and C, and remains in the area 1. In a case where the latter half of the partial program A particularly has a high level of confidentiality, it is not very desirable to have it remain located for a long time in view of security protection.

In the area 3, in spite of the fact that the process of the partial program H is completed at the end of the time period t1, the data of the partial program H remains from the beginning of the time period t2 till the next partial program I gets located.

In the present modification example, every time a partial program is decrypted and located in the memory space, it is checked if there is a difference between the size of the location area and the size of the partial program. When the area size is larger, the problem mentioned above will be solved by embedding (overwriting with) dummy data (a dummy program) into the space area in that area. When a partial program finishes being processed, elapsed time will be measured starting from that point, and when a predetermined time has elapsed, the whole area will be overwritten with dummy data. This process mentioned here will be performed by a controlling unit. (Hereafter, it will be referred to as the controlling unit 11' in order to distinguish it from the controlling unit 11 in the embodiment.)

FIG. 8 is a conceptual drawing to show the general structure of the dummy data embedding process. The drawing shows the locating of the partial programs into a particular area N and how the dummy data are embedded along the time line. In the time periods T2, T3, and T5, since the size of each of the partial programs being located is small, a piece of dummy data is embedded to fill the difference between the area size and the partial program size. In the time period T4, a piece of dummy data is embedded into the whole area because there is a time lapse of a predetermined length after the immediately preceding partial program finishes being processed.

When the controlling unit 11' locates a partial program decrypted by the partial program decrypting unit 123 in one of the areas in the shared memory M according to the memory location information, the controlling unit 11' obtains the size of the partial program after the decryption (the size being specified by the memory location defining unit 14' as a part of the memory location information) and also obtains the size of the location area by referring to the shared memory M.

The controlling unit 11' compares the values of these two sizes and, when the area size is larger, reads dummy program data as much as the difference between the sizes from the dummy program storage area, and embed the data into the space area in that area (the space after the end of the partial program and/or the space before the beginning of the partial program). Through this process, the data of the partial program that has immediately previously been located in the area will be completely deleted.

The dummy data embedding process in correspondence with a time lapse will be performed after a partial program finishes being processed. When a partial program loaded into an area finishes being processed, the controlling unit 11' starts measuring elapsed time with a built-in timer for this particular area. When the elapsed time reaches a predetermined value, if a next partial program to be loaded into this area has not been decrypted yet, then dummy data will be embedded into the whole area.

Through this process, the data of the partial program that has immediately previously been located in the area will be completely deleted. The dummy data is practically a program that is actually not executed, or a code of a program that does not perform meaningful processing when executed.

Modification Example 4

In the present modification example, security protection is strengthened for each partial program by having a different arrangement for the storing location of the encryption keys and the procedures to obtain the encryption keys. More specifically, it is arranged so that an encryption key for decrypting one partial program can be obtained from another partial program that has legitimately been loaded into the shared memory M before that one partial program.

In the present modification example, in each partial program, either (i) an encryption key for decrypting another partial program that is to be called by this particular partial program, or (ii) some data used for obtaining the encryption key is embedded. When the called partial program needs to be decrypted, the encryption key or the data for obtaining the encryption key that is embedded into the calling partial program will be used.

Basic Example

The most basic embodiment of this method is as follows:
First, before the encrypted-program generating device C encrypts a calling partial program, an encryption key used for encrypting a called partial program is embedded into the calling partial program. Then, the calling partial program gets encrypted. Subsequently, the embedding location of the encryption key is stored into the storing unit 16.

Next, when the called partial program needs to be decrypted, the partial program decrypting unit 123 reads, from the storing unit 16, the embedding location information related to the calling partial program, and reads the encryption key from the calling partial program located in the shared memory M according to the embedding location information, and then decrypts the called partial program using the encryption key.

A situation is imagined, for example, where an illegitimate user takes over the control in an illegitimate fashion and has a call instruction issued that is for loading a desired partial program into the memory. In such a case, the legitimate partial program that is supposed to call the desired partial program does not exist in the shared memory M; therefore, it is not possible to obtain the encryption key and to decrypt the desired partial program according to the method of the present modification example. Thus, the partial program desired by the illegitimate user will not be loaded into the shared memory M, and it is possible to prevent illegitimate references.

Advanced Examples

The basic mode of the present modification example is as mentioned above. It is also possible to more firmly ensure security protection by making a further adjustment. The following explains advanced examples.

Advanced Example 1

Figure 9:
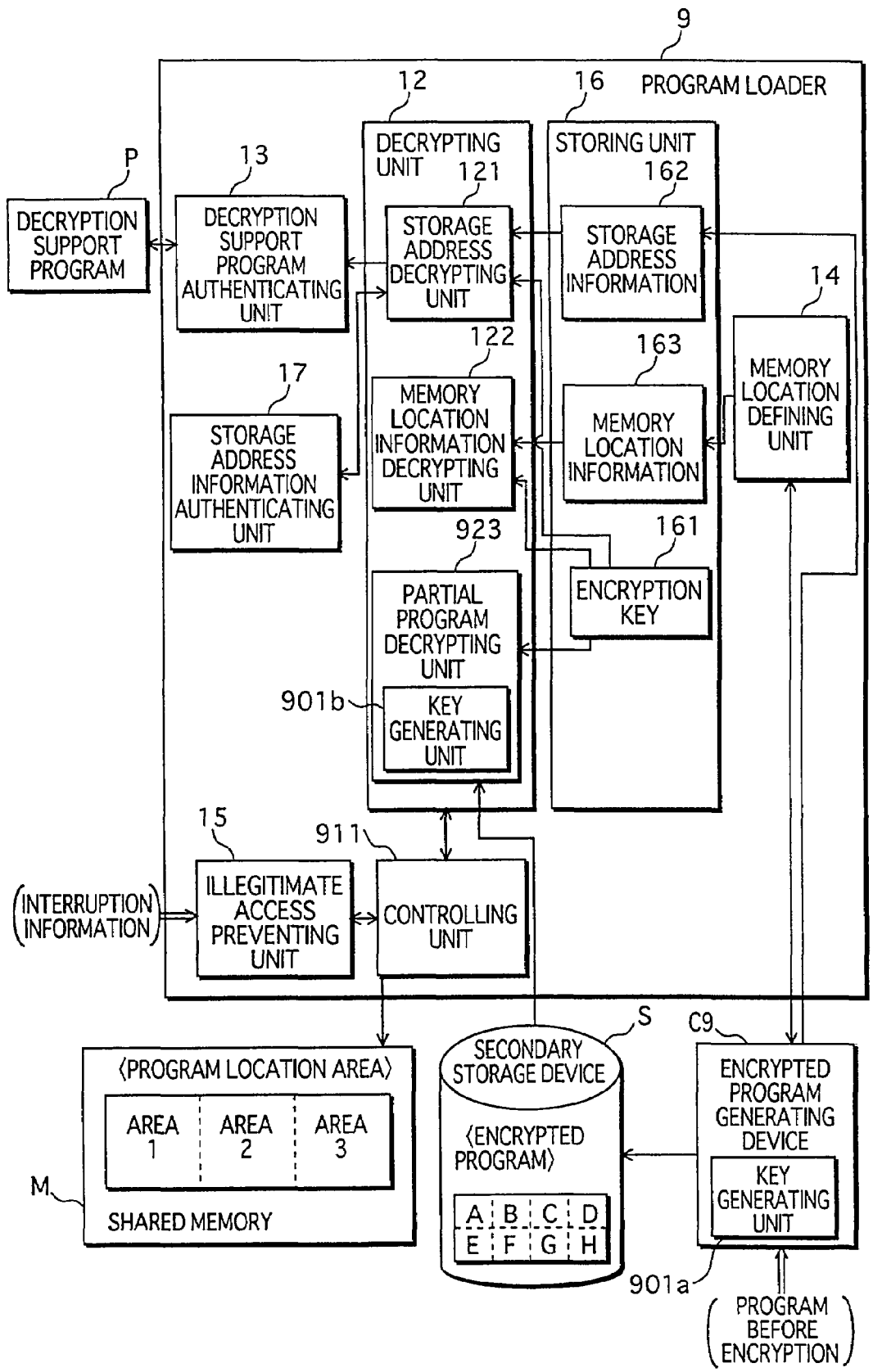
FIG. 9 is a block diagram to show the structure of the program loader in a modification example.

FIG. 9 shows a program loader 9 of the present advanced example that generates an encryption key used for encryption/decryption of the called partial program from part of the codes in the calling partial program, with an arrangement wherein a component that performs encryption (the encrypted-program generating device C9) and a component that performs decryption (the partial program decrypting unit 923) each have the same encryption key generating means (the key generating units 901*a* and 901*b*) in common. It should be noted that components that perform the same processes as those in the program loader 1 are provided with the same reference numbers, and explanation will be omitted.

Process at Times of Encryption

The encrypted-program generating device C9 at first generates call relation information that indicates call relation between the partial programs, and then converts each partial program into execute form. Next, the encrypted-program generating device C9 generates an encryption key for each partial program with reference to the call relation information, and encrypts each partial program using each encryption key.

Figure 10:
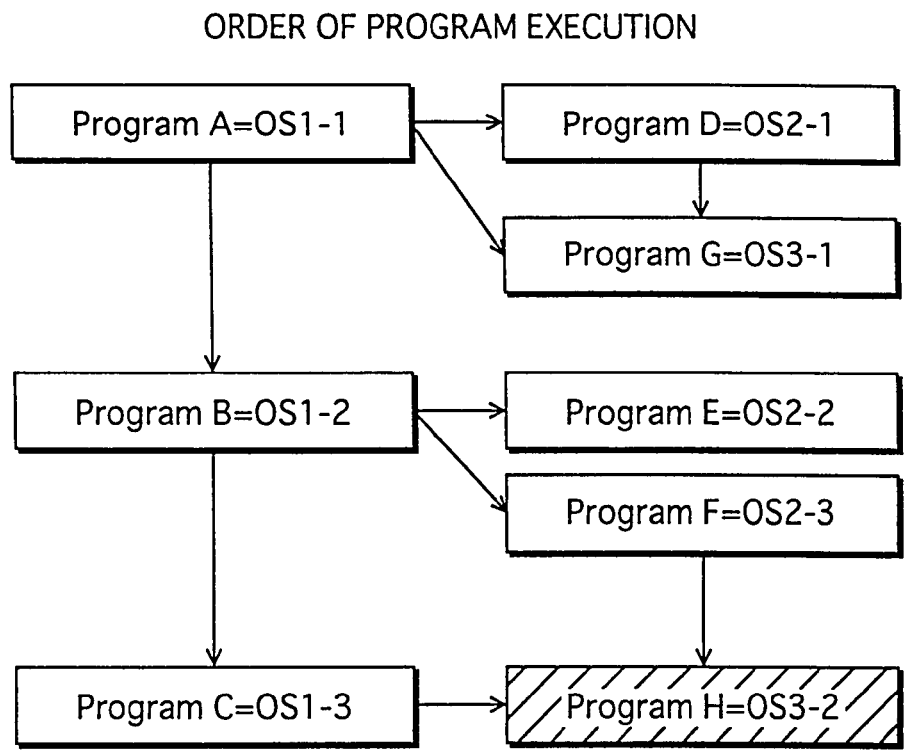
FIG. 10 is a schematic drawing to show the call relation between partial programs defined by the call relation information.

FIG. 10 is a schematic drawing to show the call relation between the partial programs.

The following explains the process that is for encrypting a partial program and is performed by the encrypted-program generating device C9. Initially, the encrypted-program generating device C9 detects a partial program that calls another partial program by referring to the call relation information, and then, reads part of the execute form codes of the calling partial program. Subsequently, the encrypted-program generating device C9 transmits the read code to the key generating unit 901*a* and instructs it to generate an encryption key. The key generating unit 901*a* calculates the hash value for the code and returns the hash value to the encrypted-program generating device C9 as an encryption key.

The encrypted-program generating device C9 encrypts the called partial program using this encryption key and attaches, to the encrypted called partial program, information indicating the position of the code used for generation of the encryption key (an offset of the code in the execute form of the calling partial program). Then, the encrypted-program generating device C9 stores the encrypted called partial program into the secondary storage device S.

In a case where a partial program is called by a plurality of partial programs, the called partial program is encrypted with encryption keys that are generated from codes that are respectively part of each of the calling partial programs. This way, a plurality of patterns of encrypted partial programs are generated from one called partial program. In such a case, it is necessary to arrange it so that the component that performs the decryption process is able to understand the correspondence by, for example, having identification information of each calling partial program attached to each corresponding pattern of encrypted partial program before storing the encrypted partial programs to the secondary storage device S. It should be noted, however, that an encryption key is necessary only when the called partial program is called while it is not in the memory, even if there are a plurality of partial programs that call the partial program; therefore, it is not necessary to generate an encryption key from a calling partial program that makes the call only while the called partial program is in the memory.

For example, as for the partial program H shown in FIG. 10, encryption keys may be made each from the partial programs C and F. It should be noted, however, if the following two conditions are both satisfied, the encryption key for decrypting the partial program H should be made only from the partial program F, and it is not necessary to generate an encryption key from the partial program C:
(i) Decryption and loading of the partial program H is triggered when the partial program H is called by the partial program F; and
(ii) the memory location information defines that, by the time the partial program C calls the partial program H, the partial program H has already been loaded into the memory.

Process at Times of Decryption

The following explains the process that is for decrypting an encrypted partial program and is performed by the partial program decrypting unit 923 at the stage of program execution. First, the partial program decrypting unit 923 receives, from the controlling unit 911, (i) identification information of a called partial program to be decrypted and loaded into the shared memory M and (ii) identification information of a calling partial program. Next, the partial program decrypting unit 923 reads the encrypted called partial program to be decrypted, from the secondary storage device S.

Subsequently, the partial program decrypting unit 923 reads, from the encrypted called partial program, such information that indicates the position of a code from which an encryption key is to be generated, and also reads, from the calling partial program loaded into the shared memory M, the code indicated by the code position. Subsequently, the partial program decrypting unit 923 transmits the read code to the key generating unit 901b and has it generate the encryption key. Then, the encrypted program decrypting unit 923 decrypts the encrypted called partial program with this encryption key. As soon as the decryption process is finished, the encryption key is deleted.

Figure 11:
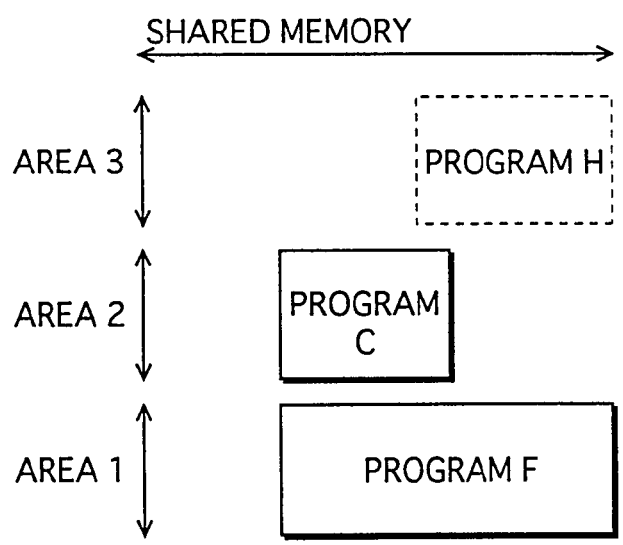
FIG. 11 is a schematic drawing to show memory locations of partial programs at the time of decryption process along a time line.

FIG. 11 is a schematic drawing to show memory locations of partial programs at the time of decryption process along the time line. In the example shown in this drawing, the loading of the partial program H into the area 3 is triggered when the partial program H is called by the partial program F that has already been loaded into the area 1. Subsequently, the partial program H that has already been loaded into the area 3 will be called by the partial program C that gets loaded into the area 2 later.

Accordingly, the partial program decrypting unit 923 decrypts the partial program H with an encryption key generated from the partial program F. The partial program decrypting unit 923 does not perform the decryption process when the partial program C calls the partial program H. It may be either one of the controlling unit 911 and the partial program decrypting unit 923 that judges that the decryption process does not have to be performed when the partial program C calls the partial program H. This judgment may be made (i) by comparing the identification information of the called partial program with the memory location information, or (ii) by checking if the called partial program has already been loaded into the memory M or not.

Advanced Example 2

Figure 12:
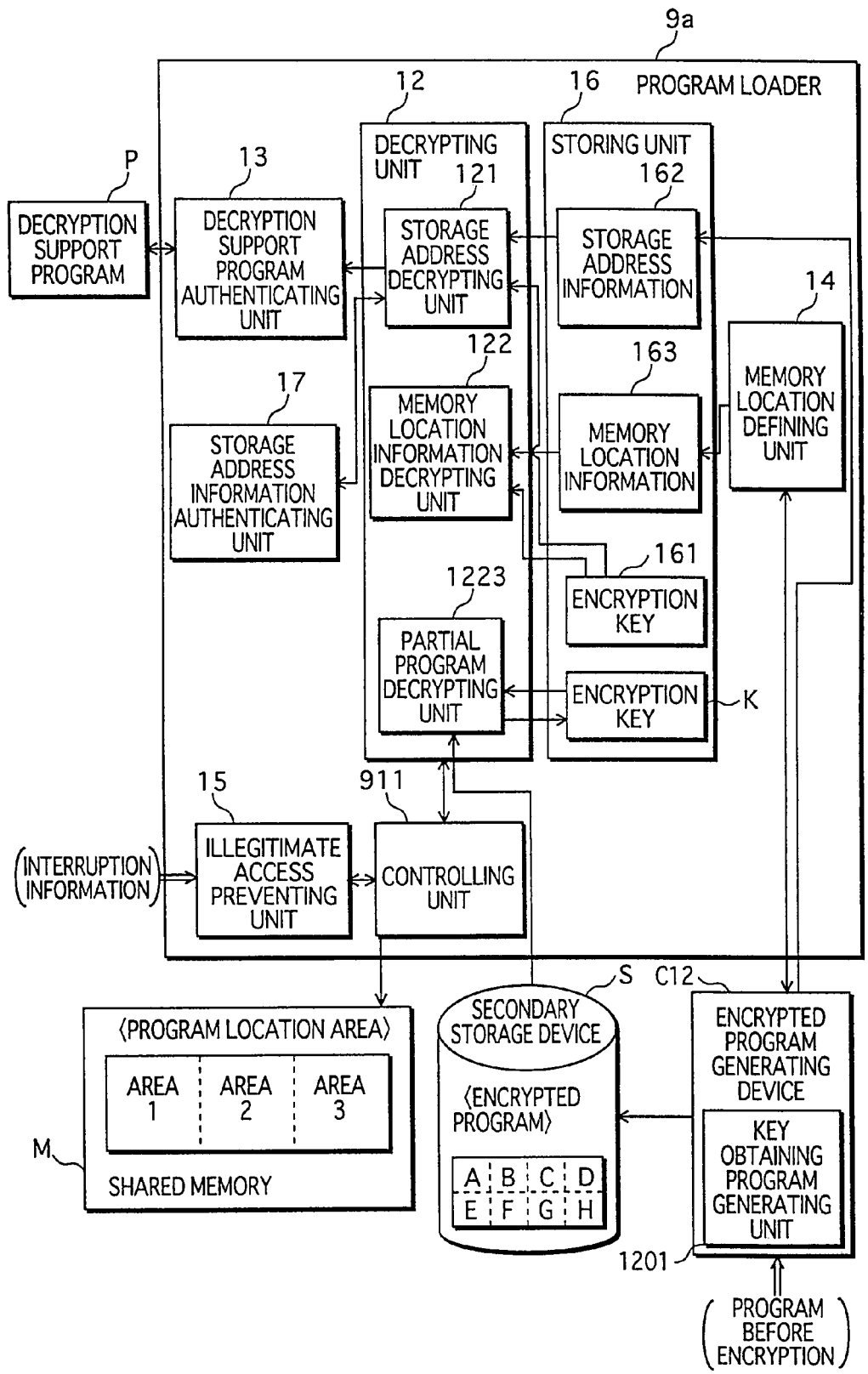
FIG. 12 is a block diagram to show the structure of the program loader in a modification example.

The following explains another advanced example:

The encrypted-program generating device C12 of the present advanced example shown in FIG. 12 embeds into a calling partial program, during the encryption process, a key obtaining program for obtaining an encryption key for a called partial program (the key obtaining program generating unit 1201 and the encrypted-program generating device C12). When decrypting the called partial program, the partial program decrypting unit 1223 obtains the encryption key by having the key obtaining program embedded into the calling partial program executed, and decrypts the called partial program using the encryption key.

Process at Times of Encryption

The process performed by the encrypted-program generating device C12 is the same as the one in the aforementioned embodiment, up to the step of converting the program to be encrypted into execute form and dividing the program into partial programs. The following explains a process performed by the encrypted-program generating device C12 when a partial program is encrypted.

The encrypted-program generating device C12 generates an encryption key K for a partial program to be encrypted, and then stores the encryption key K into a predetermined storing position, as well as holds information that indicates the storing position (an address, an offset, or the like). This storing position may be in a predetermined area inside the secondary storage device S, or inside another partial program that is loaded into the shared memory M when the partial program gets decrypted, or the like. The encrypted-program generating device C12 notifies the storing position to the key obtaining program generating unit 1201 and has it generate such a key obtaining program that performs "a process of reading the encryption key K from the storing position and writing it into a predetermined position (an area assigned for storing the encryption key K for the particular partial program) inside the storing unit 16".

When finishing the process mentioned above for the particular partial program, the encrypted-program generating device C12 embeds the key obtaining program into another partial program that is to call this particular partial program. The key obtaining program is embedded into a position, for example, immediately before the process in which the particularly partial program is called.

When completing, for each of all the partial programs, the processes of generating a key obtaining program and embedding the key obtaining program into each calling partial program, the encrypted-program generating device C12 encrypts the partial programs.

Process at Times of Decryption

The process of obtaining an encryption key used in decryption is similar to the one in the aforementioned embodiment. When receiving an instruction for decrypting a partial program, the partial program decrypting unit 1223 reads the encryption key K by referring to the area, that is inside the storing unit 16 and is assigned for storing the encryption key K for this particular partial program, and performs the decryption process using this encryption key K. This encryption key K has been written into this area through execution of the key obtaining program embedded into the calling partial program that has already been loaded into the shared memory M. When finishing the decryption process, the partial program decrypting unit 1223 deletes the encryption key K from the area. Even if the same partial program is called again, since the key obtaining program embedded in the calling partial program writes the encryption key K into the same area at that time, there will be no problem in deleting the decryption key K.

Through this process, it is possible to reduce the risk of having the encryption key stolen in the present modification example, compared to a case where an encryption key that is in common for all the partial programs is always stored in a predetermined location such as a storing unit. Also, even if an encryption key for one partial program should be stolen by any chance, there will be no influence to the other partial programs. Further, it is possible to arrange it so that a called partial program can be decrypted only when being called by a legitimate calling program in the original legitimate process flow; therefore, even if a person who has illegitimately taken over the control attempts to have a particular partial program loaded into the memory for the purpose of illegitimate reference, he/she will not be able to make an illegitimate reference because there will be no encryption key available.

Notes for Modification Example 4

It should be noted that, in the explanation above, data or a program for obtaining an encryption key used in the decryption process of a called partial program is embedded in a calling partial program, but it is also acceptable that the data or the program is embedded in some other places. For example, it is also acceptable to embed the data or the program for obtaining an encryption key into one of partial programs (not the calling partial program) that exist in the shared memory when the calling is made. Also, as an alternative, it is also acceptable that, when a partial program finishes being executed and gets deleted from the shared memory, the controlling unit reads only the data or program that is for obtaining an encryption key and has been embedded in that partial program, and stores the data or program into an area exclusively for it, and then use it in a decryption process to be performed later for another partial program.

In the explanation above, it is arranged so that the data or program for obtaining an encryption key is embedded into a single partial program (a calling partial program); however, it is also acceptable if it is embedded into a plurality of partial programs.

For example, in order to embed an encryption key itself, it is acceptable that the encryption key is divided and embedded into a plurality of partial programs that are in the shared memory M when a partial program being a decryption target is called, and that, at the time of decryption, the partial program decrypting unit reads these divided encryption key and puts them together to obtain the encryption key. It would be a good idea that the memory information defining unit, for example, separately specifies, at the time of encryption, some information that indicates (i) from which locations of what partial programs the divided encryption keys are to be read, and (ii) in what order the divided encryption keys that have been read should be put together to obtain an encryption key.

When an encryption key obtaining program is used, it is also possible to, for example, obtain the encryption key for the partial program H in the following manner, in a case where the partial programs are executed in the order of A, C, and then H: (i) when the partial program A is executed, the encryption key obtaining program embedded into the partial program A writes the first half of the encryption key for the partial program H into the first half of the encryption key storage area in the storing unit 16, and (ii) when the partial program C is executed, the encryption key obtaining unit embedded into the partial program C writes the second half of the encryption key for the partial program H into the second half of the encryption key storage area. Through this process, when the partial program H is called, the encryption key for the partial program H is stored in the storing unit in a complete state.

It should be noted that it is possible to use the different methods mentioned above in combination as long as there is no incompatibility.

Further, in the explanation above, the encrypted-program generating device comprises the component that performs the process of embedding an encryption key into an encrypted program, such as the key generating unit 901*a*, or the key obtaining program generating unit 1201; however, it is also acceptable that the program loader comprises one of those along with the memory location defining unit.

In the present modification example, the encrypted-data decrypting apparatus of the present invention is embodied as the program loader together with the component that performs the process of embedding an encryption key into an encrypted program such as the key generating unit 901*a*, or the key obtaining program generating unit 1201, each of which is part of the encrypted-program generating device.

Modification Example 5

In the present modification example, security protection is strengthened by encrypting, with use of an encryption key for a key, an encryption key that is used in the encryption/decryption processes for a partial program. In addition, prior to the encryption process for the program, an encryption key for a key is generated individually for each of the partial programs. Each "encryption key for a key" will be used in the encryption/decryption processes for an encryption key at the time of encryption/decryption of each partial program that is to be called by a corresponding partial program.

Figure 13:
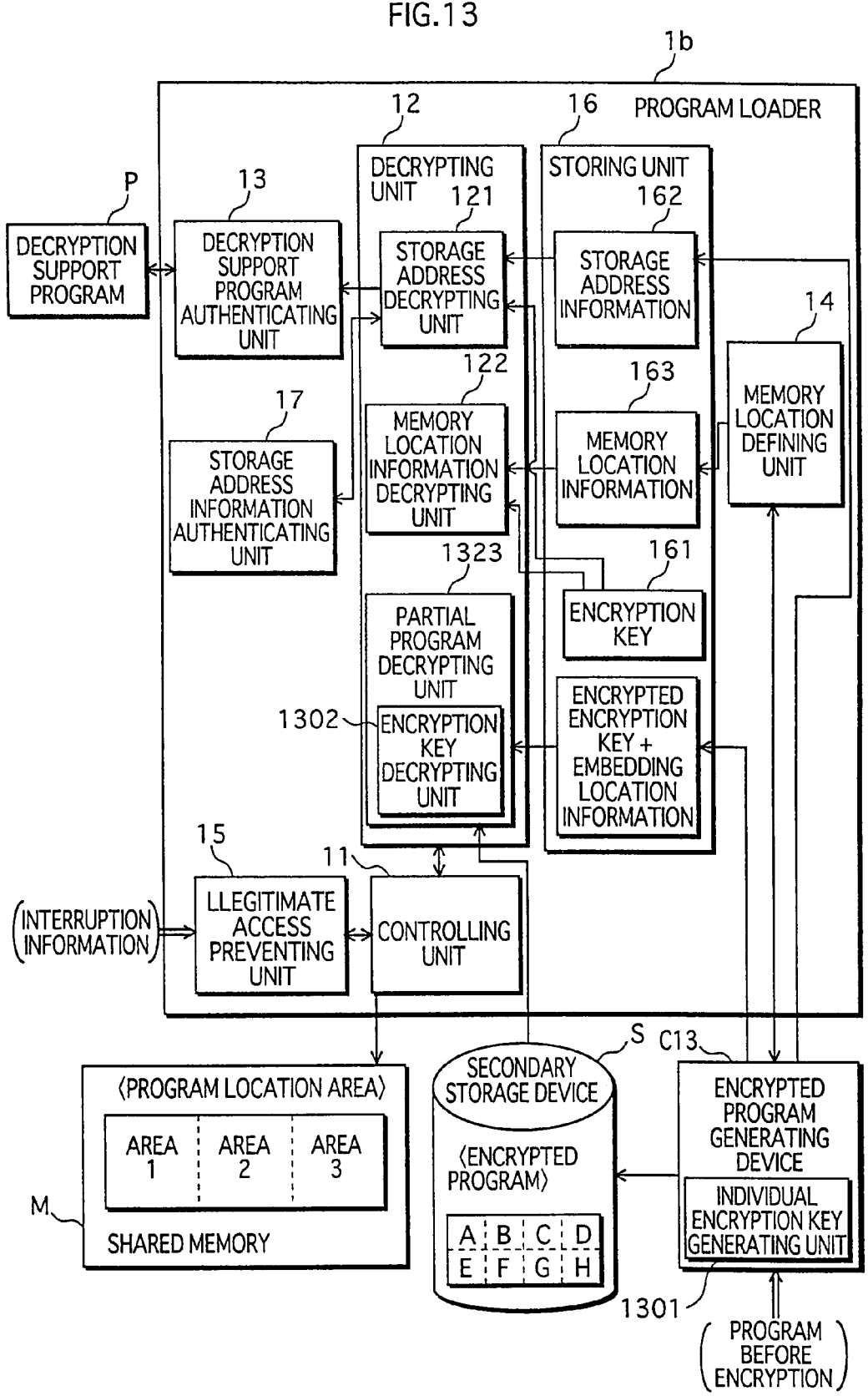
FIG. 13 is a block diagram to show the structure of the program loader in a modification example.

FIG. 13 is a block diagram to show the structures of the program loader 1*b* and the related devices in the present modification example. In this arrangement, an individual encryption key generating unit 1301 (in the encrypted-program generating device C13) and an encryption key decrypting unit 1302 (in the program loader 1*b*) are added to the structure in the aforementioned embodiment.

Process at Times of Encryption

The following describes a process in which the encrypted-program generating device C13 encrypts a partial program. First, the encrypted-program generating device C13 instructs the individual encryption key generating unit 1301 to generate "an encryption key for a key" individually for each of the partial programs. Then, the encrypted-program generating device C13 embeds each "encryption key for a key" into each partial program and, at the same time, generates information that indicates embedding location, ("embedding location information").

Subsequently, the encrypted-program generating device C13 encrypts the partial program using an encryption key for encrypting the program (this encryption key common to all the partial programs). Then, the encrypted-program generating device C13 detects another partial program that calls this partial program referring to the call relation information which is the same as the one used in the modification example 4.

Next, the encrypted-program generating device C13 encrypts the encryption key for encrypting the partial program, using "the encryption key for the key" corresponding to the calling partial program. Then, the encrypted-program generating device C13 transmits, to the storing unit 16, (i) the encrypted encryption key, (ii) identification information of the corresponding partial program and of the calling partial program, and (iii) the embedding location information that was generated in advance so that the storing unit 16 stores these in the area for an encrypted encryption key.

Process at Times of Decryption

The decryption process is performed by the encryption key decrypting unit 1302 and the partial program decrypting unit 1323. The partial program decrypting unit 1323 that is going to decrypt a certain partial program, at first, informs the encryption key decrypting unit 1302 of identification information (obtained from the controlling unit 11) of the partial program to be decrypted and of another partial program that calls the partial program. According to the identification information, the encryption key decrypting unit 1302 reads, out of the sets of "an encrypted encryption key" and "embedding location information of an encryption key for a key" that are stored in the storing unit 16 in correspondence with each partial program, such a set that corresponds to a combination of the partial program to be decrypted and the calling partial program.

Next, the encryption key decrypting unit 1302 reads the "encryption key for a key" from a predetermined location in one of the calling partial programs that are in the shared memory M, the predetermined location being indicated by the embedding location information. Then, the encryption key decrypting unit 1302 decrypts, using the encryption key for a key, "the encrypted encryption key" for the partial program to be decrypted so as to obtain an encryption key, and outputs it to the partial program decrypting unit 1323.

The partial program decrypting unit 1323 decrypts the partial program using the decrypted encryption key.

In the explanation above, the partial programs have an encryption key in common for them to be encrypted with, and "an encryption key for a key" to encrypt/decrypt the encryption key is individually provided for each partial program; however, it is also acceptable that each partial program respectively has an individual encryption key.

Also, in the explanation above, the encrypted-program generating device comprises (i) the individual encryption key generating unit 1301, (ii) the component that generates the embedding location information, and (iii) the component that performs the process of storing the encrypted encryption key and the embedding location information into the storing unit 16; however, it is also acceptable that the program loader comprises them along with the memory location defining unit.

Modification Example 6

In the present modification example, when a partial program gets located into the shared memory M, the location position can be dynamically determined within the program location area. In the present modification example, unlike the embodiment in which the location position is fixed according to the memory location information, each partial program is located into a different position every time of execution. Thus, it is possible to reduce the risk of illegitimate references and tampering of the partial program loaded into the memory, and to ensure security protection more firmly.

Structure

Figure 14:
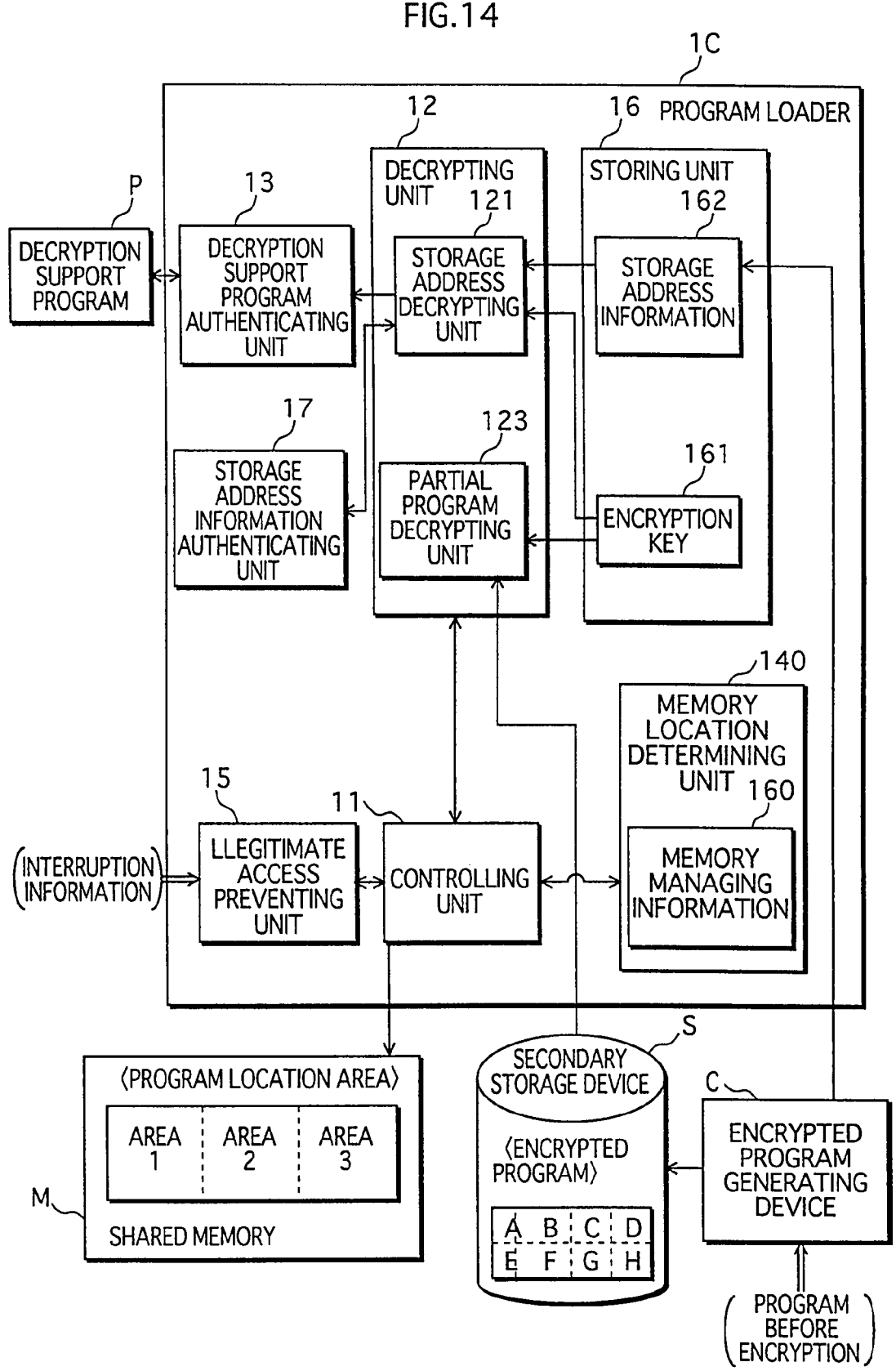
FIG. 14 is a block diagram to show the structure of the program loader in another modification example.

FIG. 14 is a block diagram to show the structure of the program loader 1c in the present modification example. The same components as in the program loader 1 in the embodiment are provided with the same reference numbers. The structural features of the program loader 1c are that it has a memory location determining unit 140 instead of the memory location information decrypting unit 152 and memory managing information 160 instead of memory location information.

The memory location determining unit 140 determines, when a partial program is called and to be located in the memory M, a memory location position for the partial program according to an instruction from the controlling unit 11 and notifies the determined position to the controlling unit 11. The memory location determining unit 140 also generates and updates the memory managing information that is used for managing the memory location positions of the partial programs in the memory. The following explains further in detail the process performed by the memory location determining unit 140, with reference to specific examples of program location.

FIGS. 15A to 15E are conceptual drawings to show how decrypted partial programs are located in the program location area 150 in the shared memory M at the time of execution of the program. The memory location determining unit 140 looks for, within the program location area 150, a space area that is big enough for a partial program to be newly located therein, and if there is such a space area, informs the controlling unit 11 of the address of the space area as the location position. Conversely, when there is no such space area, the memory location determining unit 140 informs the controlling unit 11 of the address of the location area for a partial program that has already been located in the program location area 150 so that the located partial program gets overwritten by the new partial program.

FIG. 16 shows the contents of the memory managing information 160 that is for the partial programs located as shown in FIG. 15 and is sequentially generated or updated by the memory location determining unit 140. The memory managing information 160 includes (i) identification information 1601 that indicates the partial program being a target, (ii) a start address 1602 that indicates the storing position (its start address) of the partial program, (iii) a size 1603 and (iv) a location order 1604 that indicates X as in an X-th partial program to be located in the shared memory M. The memory location determining unit 140 generates a new piece of memory managing information for a partial program to be newly located, and deletes the piece of memory managing information for the partial program to be overwritten by the new one; therefore, there are as many pieces of memory managing information as the number of the partial programs currently located in the program location area 150.

As shown in FIG. 15A, the partial programs A, B, and C are sequentially located in the program location area 150. In correspondence with this, the memory location determining unit 140 sequentially generates memory managing information that corresponds to each of the partial programs (FIG. 16A). It should be noted that, although the partial program A that gets located first is positioned at the beginning of the program location area 150 in the drawing, the position does not have to be fixed at the beginning. This is because if it is fixed at the beginning, the first partial program and some following partial programs would inevitably be located in almost the same positions every time they are executed, and thus, the object of the present modification example would not be achieved, the object being to make an illegitimate reference difficult by dynamically changing the location positions every time of execution. Consequently, when the first partial program is located, the position will be slid as much as an offset determined using random numbers or the like, so that it is possible to avoid having the location position fixed at the beginning of the program location area 150.

At the state shown in FIG. 15A, the partial program D is called by the partial program C. At this time, there is no space area big enough for locating the partial program D therein; therefore, the memory location determining unit 140 determines the memory location position of the partial program D so that the partial program A, which has been in the memory M for the longest time at this point, gets overwritten by the partial program D. In other words, the memory location determining unit 140 determines the start position of the partial program D in the memory as the same value with that of the partial program A. FIG. 15B shows the state in which the partial program D is located according to such memory location information. Since the size of the partial program D is large, the latter half of the partial program D extends over the first half of the partial program B. At this point, the memory location determining unit 140 deletes the memory managing information regarding the partial programs A and B, and generates the memory managing information regarding the partial program D.

Subsequently, the memory location determining unit 140 determines the memory location positions for the partial program E (FIG. 15C), the partial program F (FIG. 15D) and the partial program G (FIG. 15E) in the stated order. The memory location determining unit 140 also updates the memory managing information 160 accordingly, to the one shown in FIG. 16B, and then FIG. 16C sequentially. (FIG. 16B corresponds to FIG. 15C, and FIG. 16C to FIG. 15E.)

When a partial program gets located into memory so as to overwrite another partial program, it does not necessarily have to be arranged as shown in FIG. 15B where memory location information is determined so that a partial program that has been located in the memory for the longest time gets overwritten, from its start position, by another partial program. Alternatively, it is also possible that a location position is determined as shown in FIG. 15D where a partial program gets overwritten by another partial program, starting from somewhere in the middle. This arrangement is made so that two or more partial programs get deleted (completely or partially) by one partial program in one overwriting. In FIG. 15D, it is arranged so that the partial program D is overwritten, starting from somewhere in the middle, by the partial program F, which is smaller than the partial program D, in order for the partial program D to overwrite the first half of the partial program E also.

By arranging it this way, even if the contents of the memory M is illegitimately referred to at the stage of FIG. 15D, for example, the only partial program that can be referred to completely is the partial program F. If the partial program D had been overwritten, from its start position, by the partial program F, then, not only the partial program F but also the partial program E would have been referred to completely. The memory location determining unit 140 judges whether the overwriting process shown in FIG. 15D is necessary or not, and where the overwriting should start, and the judgment is made from the positions of the partial program D and the following partial program E in the program location area, and the size of the partial program F which is to overwrite the others.

It should be noted that, in order to perform the process mentioned above, the memory locationdetermining unit 140 obtains from the controlling unit 11 the identification information and the size of the partial program to be located into the memory. Such information as the start address and the size of the program location area in the memory M is also stored in advance.

Operation

The following explains the operation of the program loader 1c (particularly the memory location determining unit 140) in the process of determining the memory location of partial programs.

Figure 17:
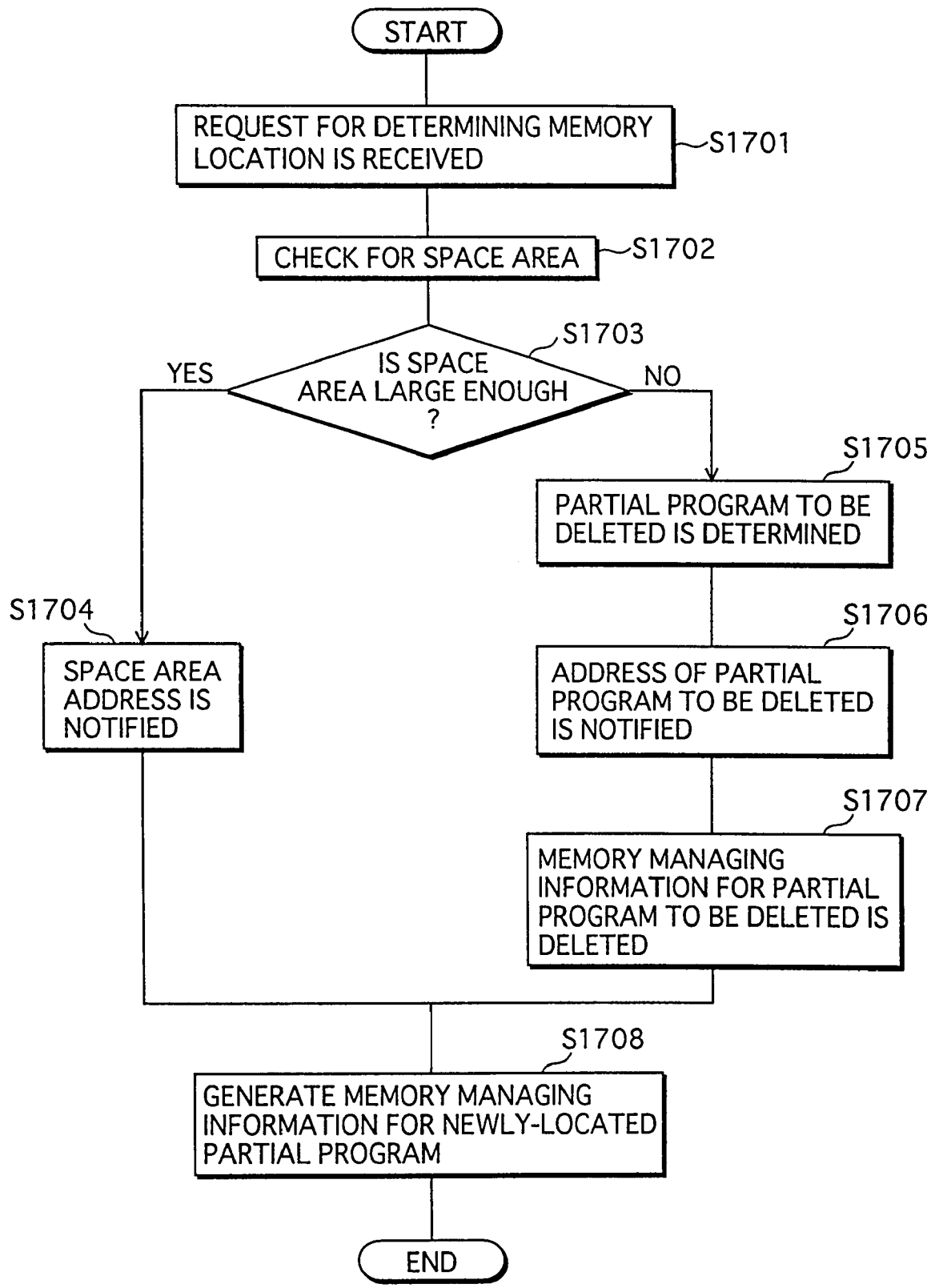
FIG. 17 is a flow chart to show the flow of the process of determining the memory location of a partial program in the modification example.

FIG. 17 is a flow chart to show the flow of the process of determining the memory location of a partial program. It should be noted that the process shown in the drawing is part of the program decryption process and the memory location process that are performed by the program loader 1c. The process in the drawing is an alternative to the process performed by the program loader 1 in the embodiment, shown as Steps S509 to S511 in FIG. 5.

First, the controlling unit 11, which has received a request that a partial program needs to be loaded, transmits (i) the request for determining a memory location, (ii) the identification information of the partial program, and (ii) the size of the partial program, to the memory location determining unit 140 (S1701). It is assumed that, prior to the request, the controlling unit 11 has finished reading the partial program from the secondary storage device S and also decrypting it.

The memory location determining unit 140 refers to the sizes of the partial programs having been located 1603 and the start addresses 1602 that are included in the memory managing information 160, and checks the position and the size of the space area in the program location area 150. The memory location determining unit 140 compares the size with the size of the partial program obtained from the controlling unit 11 and judges if there is a space area that is large enough for locating the partial program therein (S1702).

When there is a large enough space area (S1703: Yes), the memory location determining unit 140 notifies the address of the space area to the controlling unit 11 (S1704), and generates the memory managing information for the partial program (S1708). Out of the memory managing information 160, as for the identification information 1601 and the size 1603, the information received from the controlling unit. 11 will be used as it is; as for the start address 1602, the address that has been notified to the controlling unit 11 will be used. The memory determining unit 140 counts the number of the partial programs having been located, with use of a built-in counter, and specifies the values of "the order of being located 1604" using the counter value.

When there is no large enough space area (S1703: No), the memory location determining unit 140 refers to the order of being located 1604 that is included in the memory managing information 160, and selects a partial program that was located in the memory the earliest (i.e. the one that has the smallest value as the order of being located 1604) among the partial programs that are currently in the memory, as the one to be deleted (S1705) Subsequently, the memory location determining unit 140 notifies the address of the area where the partial program to be deleted is located, to the controlling unit 11 (S1706).

When the size of the partial program to be newly located is larger than the partial program to be deleted (see FIG. 15B), the start address of the partial, program to be deleted will be notified to the controlling unit 11. Conversely, when the size of the partial program to be newly located is smaller than the partial program to be deleted (see FIG. 15D), the address of somewhere in the middle of the area in which the partial program to be deleted is located will be notified to the controlling unit 11. It is arranged this way because, as mentioned earlier, it is better if a plurality of partial programs having already been located in the memory get overwritten by loading of one partial program. The value of the address is specified so that the newly-located partial program is present on the both sides of the boundary between the partial program to be deleted and the following partial program (i.e. the partial programs D and E in FIG. 15C). The value can be found from the end address of the partial program to be deleted, the start address of the following partial program, and the size of the newly-located partial program.

Further, the memory location determining unit 140 generates the memory managing information of the newly-located partial program (S1708), and deletes the memory location information of the partial program that has been overwritten by the newly-located partial program (S1707).

SUMMARY

As so far explained, according to the program loader 1c in the present modification example, since the memory location positions are dynamically determined, it is possible to reduce the risk of having the partial programs loaded into the memory being referred to illegitimately or being tampered, and thus to ensure security protection more firmly.

It should be noted that, in the explanation above, the previously existing partial programs get overwritten by a newly-located partial program; however, it is also acceptable if the previously existing partial programs get deleted first, and then, the newly-located partial program gets located into the area obtained from the deletion. When using the overwriting process, when a previously existing partial program is larger than the newly-located partial program, part of the previously existing partial program will remain in the memory; however, when using the process in which deletion occurs before locating the partial program, it is possible to avoid the situation where part of the partial program remains. Additionally, in order to avoid the situation where part of the partial program remains, it is also acceptable to perform the overwriting process first with the newly-located partial program, and then overwrite the remaining part with dummy data. The area to be overwritten by the dummy data will be judged from the start positions and the end positions of both the previously existing partial program and the newly-located partial program.

Additionally, in the explanation above, the location area is dynamically changed within the program location area every time the program is executed; however, it is also acceptable to arrange it so that the address of the program location area is also changed every time the program is executed. In such a case, when the execution of the program starts, the controlling unit 11 determines the address of the program location area and notifies it to the memory location determining unit. This way, it is even more difficult to illegitimately refer to the contents of the program location area, and the security protection is improved.

Further, it is also acceptable to set the size of the program location area arbitrarily. When the size of the program location area is small, the number of the programs to be located therein becomes small as much; therefore, even if an illegitimate reference occurs, information to be leaked is limited.

The present modification example is the same as the modification example 2 and 3 in that its object is to prevent the situation where "because the location positions of the partial programs are fixed, it is easy to make an illegitimate reference". Thus, it is also possible to combine the present modification example with each of these modification examples. In other words, it is acceptable to change the address of the program location area in the present modification example every time the program is executed using the method shown in the modification example 2. Also, in a case where the previously existing partial programs get overwritten by the newly-located partial program, and yet parts of the previously existing programs remain, as shown in FIGS. 15B and 15D, it is acceptable to overwrite the remaining parts with pieces of dummy data as in the modification example 3. (The area to be overwritten by the dummy data will be judged from the start positions and the sizes of the previously existing partial programs, and the start position and the size of the newly-located partial program.)

Additional Information

The following are notes regarding the embodiment and the modification examples that have been mentioned so far.

In the embodiment, only the program that is to be decrypted with the decryption support program is divided into partial programs so as to actualize security protection; however, it is also acceptable that the decryption support program is also encrypted as a group of partial programs, and gets decrypted, loaded into the memory, and executed in units of partial programs. This way, it is possible to reduce the risk of causing the contents of the algorithms and the encryption keys used in the decryption process to be read from the description support program in the memory, and thus to realize a higher level of security protection.

In addition to the process mentioned in the embodiment, it is also acceptable that, in order to check if each partial program is not altered while being executed after being loaded into the memory M, the contents of each partial program at the time of being loaded into the memory M is compared with those at the time of completion of the execution. When alteration is detected, the process is discontinued, and the decrypted data gets deleted.

The encryption key mentioned above is an encryption key used in an encryption method such as, for example, DES, and is arranged so that the encryption key is embedded usually in a predetermined area of the program, or hidden in an area or a file that cannot be viewed by the user; however, the encryption method may be a different one. In order to simplify the encryption method, it is also acceptable to simply calculate an exclusive logical OR of the values. The method of hiding the key is not limited to the one above, either.

Additionally, the partial program decrypting unit, the storage address decrypting unit, and the memory location information decrypting unit may constitute a single component together, or alternatively may be individual components. When they constitute a single component together, a unit requesting a decryption process specifies, as a parameter, information indicating a type of data to be decrypted, and the decrypting unit performs the decryption process, by referring to the information, in correspondence with the type of data specified.

Further, the explanation has been provided assuming that the decryption target is a program; however, it is also possible that the decryption target is data other than a program.

It is also acceptable to arrange it so that a program is divided into units of modules or units of routines in order to obtain partial programs. Alternatively, it is also acceptable that, in a case where some parts prepared in advance, such as DLL, are combined so as to operate as a single program, each of these parts either individually or collectively may be taken as a partial program. The premise of the present invention is that a plurality of partial programs collectively operate as a single program, and it is not an essential issue how partial programs are generated.

In addition, each of the apparatuses and the devices presented in the embodiment and the modification examples may be actualized as a program to be executed by a computer. When each of them is actualized as a program, it is also acceptable to arrange it so that the encrypted-data decrypting program itself is saved as a group of encrypted partial programs, and gets decrypted and executed in units of partial programs.

The characteristic arrangements presented with regard to the embodiment and the modification examples may be used in combination as long as there is no incompatibility.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. An encrypted-data decrypting apparatus that decrypts, for a purpose of execution on a computer system, a program that has been encrypted and stored, the encrypted-data decrypting apparatus comprising:

a storing unit operable to store therein the program as a plurality of partial programs having been encrypted;

a memory location information reading unit operable to read, for each of the partial programs, memory location information indicating into which location area each partial program is to be located after being decrypted, the location area being included in a memory space used for the execution of the program;

a decrypting unit operable to sequentially read and decrypt the partial programs; and a loading unit operable to locate each of the decrypted partial programs into each location area indicated by the memory location information, wherein the memory location information indicates, with respect to at least one of the partial programs, at least part of the at least one partial program gets overwritten into a location area where one or more other partial programs have already been located before the at least one partial program gets decrypted.

2. The encrypted-data decrypting apparatus of claim 1, wherein at least part of the memory location information is stored after being encrypted, and the loading unit locates each of the decrypted partial programs into each location area after decrypting the encrypted part of the memory location information.

3. The encrypted-data decrypting apparatus of claim 1, wherein at a time of locating each partial program into a location area, when a size of the location area is larger than a size of the partial program, the loading unit writes dummy data into a space area, which is a portion of the location area that has not been overwritten because of a difference between the sizes.

4. The encrypted-data decrypting apparatus of claim 1, wherein after execution of one partial program located into a location area finishes, if another partial program is not located into the location area, the loading unit deletes the one partial program.

5. The encrypted-data decrypting apparatus of claim 1, wherein the decrypting unit performs decryption on a partial program, using an encryption key embedded in one or more partial programs that have already been decrypted and located in the memory space, the one or more partial programs being other than the partial program.

6. The encrypted-data decrypting apparatus of claim 1, wherein
the loading unit dynamically determines an absolute address of each location area before one of the partial programs that is to be decrypted first gets located into the memory space.

7. The encrypted-data decrypting apparatus of claim 6, further comprising:

a memory location determining unit, wherein the loading unit includes a memory management information storing unit storing location information indicating locations at which the partial programs have been located, and the memory location determining unit generates the memory location information based on the location information.

8. The encrypted-data decrypting apparatus of claim 7, wherein
the memory location determining unit generates the memory location information based on a random number generated for each execution of the program.

9. The encrypted-data decrypting apparatus of claim 7, wherein the memory management information storing unit stores therein sequence information indicating a sequence in which the loading unit has located the partial programs, and the memory location determining unit generates the memory location information based on the sequence information.

10. The encrypted-data decrypting apparatus of claim 1, wherein the decrypting unit performs decryption on each partial program with use of a decryption support program, and the encrypted-data decrypting apparatus further comprising:

a decryption program confirming unit operable to confirm authenticity of the decryption support program, and the decryption unit causes the decryption program confirming unit to confirm the authenticity of the decryption support program before the decryption, and performs the decryption only after the authenticity is confirmed.

11. The encrypted-data decrypting apparatus of claim 1, further comprising:

an illegitimate access preventing unit operable to, when detecting an interruption, perform an illegitimate access preventing process by deleting one or more partial programs that are already located in the memory space.

12. The encrypted-data decrypting apparatus of claim 11, wherein the illegitimate access preventing unit has a dummy program executed when performing the illegitimate access preventing process.

13. The encrypted-data decrypting apparatus of claim 1, further comprising:

an illegitimate access preventing unit operable to, when detecting an interruption, make a judgment on whether theinterruption has been caused intentionally, and perform an illegitimate access preventing process by deleting one or more partial programs that are already located in the memory space when the judgment is negative.

14. The encrypted-data decrypting apparatus of claim 13, wherein the illegitimate access preventing unit has a dummy program executed when performing the illegitimate access preventing process.

15. The encrypted-data decrypting apparatus of claim 1, further comprising:

a storing position information authenticating unit operable to judge whether storing position information indicating, for each of the partial programs, a storing position in the storing unit is authentic, wherein when the storing position information authenticating unit judges affirmatively, the decrypting unit reads, from the storing unit, and decrypts each of the partial programs.

16. An encrypted-data decrypting method for decrypting, for a purpose of execution on a computer system, a program that has been encrypted and stored, the encrypted-data decrypting method comprising:

a memory location information reading step of reading, for each of partial programs stored in a storing unit, memory location information indicating into which location area each partial program is to be located after being decrypted, the location area being included in a memory space used for the execution of the program;

a decrypting step of sequentially reading and decrypting the partial programs; and a loading step of locating each of the decryptedpartial programs into each location area indicatedby the memory location information, wherein the memory location information indicates, with respect to at least one of the partial programs, at least part of the at least one partial program gets overwritten into a location area where one or more other partial programs have already been located before the at least one partial program gets decrypted.

17. A recording medium recording thereon a program that makes a computer operate as an encrypted-data decrypting apparatus that decrypts, for a purpose of execution on a computer system, a program that has been encrypted and stored, wherein the encrypted-data decrypting apparatus includes:

a memory location information reading unit operable to read, for each of partial programs stored in a storing unit, memory location information indicating into which location area each partial program is to be located after being decrypted, the location area being included in a memory space used for the execution of the program;

a decrypting unit operable to sequentially read and decrypt the partial programs; and a loading unit operable to locate each of the decrypted partial programs into each location area indicated by the memory location information, wherein the memory location information indicates, with respect to at least one of the partial programs, at least part of the at least one partial program gets overwritten into a location area where one or more other partial programs have already been located before the at least one partial program gets decrypted.

18. The encrypted-program generation apparatus of claim 17, wherein the memory location information generating unit dynamically determines an absolute address of each location area before one of the partial programs that is to be decrypted first gets located into the memory space.

19. The encrypted-program generation apparatus of claim 17, wherein the memory location information generating unit generates the memory location information based on a random number generated for each execution of the program.

20. An encrypted-program generating apparatus that encrypts a program that is to be executed on a computer system, comprising:

a program dividing unit operable to divide the program in units of a plurality of partial programs to be located in a memory space used for the execution of the program and be executed;

a program encrypting unit-operable to encrypt the program in units of the plurality of partial programs; and a memory location information generating unit operable to generate memory location information indicating, for each of the encrypted partial programs, into which location area each encrypted partial program is to be located after being decrypted, the location area being included in the memory space, wherein the memory location information indicates, with respect to at least one of the partial programs, at least part of the at least one partial program gets overwritten into a location area where one or more other partial programs have already been located before the at least one partial program gets decrypted.

21. The encrypted-program generating apparatus of claim 20, wherein the program dividing unit embeds, into at least one of the plurality of partial programs, information used in a decryption process for a different partial program, and in a decryption process for the one partial program, information embedded in a different partial program that has previously been decrypted is used.

22. The encrypted-program generation apparatus of claim 20, wherein the information used in the decryption process for the one partial program is part or all of an encryption key used in the encryption process for the different partial program.

23. The encrypted-program generation apparatus of claim 20, wherein the information used in the decryption process for the one partial program is an encryption key generation program used for generating part or all of an encryption key that is used in the decryption process for the different partial program.

24. The encrypted-program generation apparatus of claim 20, wherein the information used in the decryption process for the one partial program is a $1^{st}$ encryption key used for decrypting a $2^{nd}$ encryption key that is used in the decryption process for the different partial program, and the decryption process for the one partial program is performed with use of a $2^{nd}$ key decrypted using a 1st encryption key obtained from a different partial program that has previously been decrypted and stored in the memory space.

25. An encryption program generating method for encrypting a program that is to be executed on a computer system, comprising:

a program dividing step of dividing the program in units of a plurality of partial programs to be located in a memory space used for the execution of the program and be executed;

a program encrypting step of encrypting the program in units of the plurality of partial programs; and a memory location information generating step of generating memory location information indicating, for each of the encrypted partial programs, into which location area each encrypted partial program is to be located after being decrypted, the location area being included in the memory space, wherein the memory location information indicates, with respect to at least one of the partial programs, at least part of the at least one partial program gets overwritten into a location area where one or more other partial programs have already been located before the at least one partial program gets decrypted.

26. A recording medium recording thereon a program that makes a computer operate as an encrypted-program generating apparatus that encrypts a program to be executed on a computer system, wherein the encrypted-program generating apparatus includes:

a program dividing unit operable to divide the program in units of a plurality of partial programs to be located in a memory space used for the execution of the program and be executed;

a program encrypting unit operable to encrypt the program in units of the plurality of partial programs; and a memory location information generating unit operable to generate memory location information indicating, for each of the encrypted partial programs, into which location area each encrypted partial program is to be located after being decrypted, the location area being included in the memory space, wherein the memory location information indicates, with respect to at least one of the partial programs, at least part of the at least one partial program gets overwritten into a location area where one or more other partial programs have already been located before the at least one partial program gets decrypted.

* * * * *